United States Patent
Mehta et al.

(10) Patent No.: US 7,572,494 B2
(45) Date of Patent: Aug. 11, 2009

(54) PROCESS FOR PACKAGING PLASTIC MATERIALS LIKE HOT MELT ADHESIVES

(76) Inventors: Atul Mehta, 5760 Timber Ridge Dr., New Berlin, WI (US) 53151; Michael A. Neperud, 4335 Cherokee Trail, Hubertus, WI (US) 53033; Nicolas E. Sajot, 2628 N. 84 St., Wauwatosa, WI (US) 53226; Dominique Chiarabini, 457, chemin du Chatelain, Noyon (FR) 60400; Chrisophe Morel-Fourrier, 7 rue Plichon, Paris (FR) 75011

( * ) Notice: Subject to any disclaimer, the term of this patent is extended or adjusted under 35 U.S.C. 154(b) by 51 days.

(21) Appl. No.: 11/956,612

(22) Filed: Dec. 14, 2007

(65) Prior Publication Data
US 2008/0118689 A1  May 22, 2008

Related U.S. Application Data

(62) Division of application No. 10/976,943, filed on Oct. 29, 2004, now Pat. No. 7,328,547.

(51) Int. Cl.
*B29D 22/00* (2006.01)
*B29D 23/00* (2006.01)
*B32B 1/08* (2006.01)

(52) U.S. Cl. ............... 428/35.7; 428/35.2; 428/220; 428/35.6; 428/500; 524/480; 524/487

(58) Field of Classification Search ............... 428/35.7, 428/220, 35.6, 500, 35.2; 524/480, 487, 524/505, 528, 556, 560, 563, 575; 525/221, 525/227, 240, 241
See application file for complete search history.

(56) References Cited

U.S. PATENT DOCUMENTS 3,061,446 A  10/1962  Norman et al.
(Continued)

FOREIGN PATENT DOCUMENTS

EP   0469564   2/1992
(Continued)

*Primary Examiner*—Michael C Miggins
(74) *Attorney, Agent, or Firm*—Andrus, Sceales, Starke & Sawall, LLP

(57) ABSTRACT

A method for packaging plastic material using a film to surround the material, and more particularly to a method for packaging hot melt adhesives, the resulting package formed thereby, and the film composition used therein. The method is preferably a coextrusion process for packaging a pressure sensitive hot melt adhesive by extruding a hot melt adhesive through a die orifice, and coextruding a wax-based polymeric film to surround the hot melt adhesive. The coated adhesive may then be formed into individual packaged units having a finite size and shape. The polymeric film comprises a composition having at least 25% by weight of a wax material, an enthalpy of fusion of at least about 100 J/g, and an elongation value at break of at least about 100%. Any type of hot melt adhesive formulation can be packaged or surrounded by the polymeric film in the process. Also, the specific enthalpy of fusion desired and/or elongation value at break desired for the polymeric film can be obtained by blending an appropriate amount of partially crystalline ethylene-based polymer together with a thermoplastic elastomeric block copolymer and/or an ethylene based or propylene-based elastomer.

29 Claims, 4 Drawing Sheets

U.S. PATENT DOCUMENTS

| | | |
|---|---|---|
| 4,093,485 A | 6/1978 | Ornsteen |
| 4,504,434 A | 3/1985 | Cooper |
| 4,680,330 A | 7/1987 | Berrier et al. |
| 5,004,778 A | 4/1991 | Waagen et al. |
| 5,041,251 A | 8/1991 | McCoskey et al. |
| 5,112,552 A | 5/1992 | Wittmann et al. |
| 5,292,468 A | 3/1994 | Colombani |
| 5,373,682 A | 12/1994 | Hatfield et al. |
| 5,392,592 A | 2/1995 | Bozich et al. |
| 5,401,455 A | 3/1995 | Hatfield et al. |
| 5,669,207 A | 9/1997 | Hull |
| 5,715,654 A | 2/1998 | Taylor et al. |
| 5,804,610 A | 9/1998 | Hamer et al. |
| 5,806,285 A | 9/1998 | Rizzieri |
| 5,819,505 A | 10/1998 | Fayolle et al. |
| 5,865,927 A | 2/1999 | Puletti et al. |
| 5,869,555 A | 2/1999 | Simmons et al. |
| RE36,177 E | 4/1999 | Rouyer et al. |
| 5,942,082 A | 8/1999 | Winter et al. |
| 5,942,569 A | 8/1999 | Simmons et al. |
| 5,987,852 A | 11/1999 | Bozich et al. |
| 6,006,497 A | 12/1999 | Waber et al. |
| 6,044,625 A | 4/2000 | Waver et al. |
| 6,067,776 A | 5/2000 | Heuer et al. |
| 6,120,899 A | 9/2000 | Cameron et al. |
| 6,138,441 A | 10/2000 | Kik et al. |
| 6,155,029 A | 12/2000 | Jain |
| 6,217,697 B1 | 4/2001 | Winter et al. |
| 6,230,890 B1 | 5/2001 | Waver et al. |
| 6,238,732 B1 | 5/2001 | Cameron et al. |
| 6,430,898 B1 | 8/2002 | Remmers et al. |
| 2004/0119198 A1 | 6/2004 | Alper et al. |
| 2006/0199884 A1 | 9/2006 | Hoenig et al. |

FOREIGN PATENT DOCUMENTS

| | | |
|---|---|---|
| EP | 0557573 | 9/1993 |
| WO | WO 01/10967 | 5/2001 |

PROCESS FOR PACKAGING PLASTIC MATERIALS LIKE HOT MELT ADHESIVES

CROSS REFERENCE TO RELATED APPLICATION

This application is a divisional of U.S. patent application Ser. No. 10/976,943 filed Oct. 29, 2004 now U.S. Pat. No. 7,328,547.

BACKGROUND OF THE INVENTION

The present invention relates to a method for packaging plastic material having a finite size and shape using a film to surround the material, and more particularly to a method for packaging hot melt adhesives using a coextrusion process, the resulting package formed thereby, and the film composition used therein.

Hot melt adhesives are substantially solid at room temperature, but are applied in a molten or flowable state. Typically, hot melt adhesives are supplied in the form of solid blocks, pillows or pellets. However, since hot melt pressure sensitive adhesives (HMPSA) or other plastic materials are typically sticky and/or soft at room temperature, there are problems associated with handling and packaging of HMPSA. Regardless of the form in which it is provided, a HMPSA not only sticks or adheres to hands, mechanical handling devices and to itself, but it also picks up dirt and other contaminates. In addition, the individual pieces of HMPSA and/or other low softening point plastic materials will tend to flow or block together into a single solid mass rendering such materials difficult to be handled and/or packaged. As a result, containment during shipment and/or storage periods is a critical aspect of delivering HMPSA, other soft adhesives, or any kind of plastic materials such as sticky and/or soft polymers.

To address this troublesome difficulty, those skilled in the art have turned to packaging techniques such as, for example, shipping adhesive compositions in rigid containers, such as 55 gallon drums, or silicone coated, corrugated or particle-board boxes, or alternatively, silicone coated polymer-based trays which are typically manufactured from a high density polyethylene. While these solutions will solve the problem, noted above, in some industrial environments, and applications, it presents a multiplicity of additional difficulties, and other drawbacks which have detracted from their usefulness. For example, the more traditional methods of shipping hot melt adhesive compositions create problems related to the cost and disposal of the packaging materials. In this regard, the silicone coated polymer based trays employed for shipping some types of hot melt adhesive compositions are relatively expensive to purchase, and the presence of a silicone coating makes such a container very difficult if not impossible to recycle. Therefore, these trays, or other similar containers, in many instances, are merely collected and disposed of in landfill sites, thereby creating a troublesome source of pollution. Further, these silicone coated containers create other difficulties in that under certain environmental circumstances a great deal of physical force must be applied to the adhesive to extract it from these containers, making the adhesive difficult and inconvenient to handle.

In response to the shortcomings noted above, some manufacturers have attempted to produce synthetic trays which are readily recyclable, or which can, alternatively, be returned and reused for subsequent shipments of adhesives. Recyclable containers, although attractive by their relative simplicity, have not been embraced widely in the industry due to an obvious lack of commercial appeal. More particularly, the development of a new, more readily recyclable tray has produced, as a byproduct, retooling, and other manufacturing expenses, which have been substantial in some respects, and which have worked as a deterrent to the adoption of this solution as an answer to the aforementioned shortcomings. Further, reusable containers are generally manufactured from a thicker gauge material to lend a measure of durability to the containers such that they may survive multiple uses. As a result, the per unit cost of such containers is usually significantly greater than disposable containers. Additionally, the costs attendant to collection and returning the spent containers or trays to the manufacturers for subsequent use has further caused this proposed solution to be quite expensive and therefore commercially unacceptable.

Many other different approaches have been tried to package plastic materials like HMPSA. One approach is to use a package material that is meltable together with and blendable into the molten adhesive composition itself just prior to application.

In one such method, molten adhesive is fed directly into a film formed in the shape of a tube, and then individual packaged adhesive units are formed by squeezing, sealing and cutting the tube. Such a process is sometimes referred to as a "form, fill and seal" process. For example, U.S. Pat. No. 5,373,682 describes a method where molten adhesive is pumped into a cylindrically-shaped tube of plastic film while the exterior surface of the film is sprayed with cooling water. The resultant individual packages referred to as "cartridges" are allowed to cool until the adhesive solidifies. Another example of making cartridges of this type is illustrated in U.S. Pat. No. 5,392,592.

In U.S. Pat. No. 6,430,898, low complex viscosity film materials are used to surround a hot melt adhesive. The film material is composed of an ethylene/$\alpha$-olefin interpolymer, which is a metallocene or single-site catalyzed interpolymer of ethylene and at least one $C_3$-$C_{20\alpha}$-olefin.

Rouyer et al, in U.S. Pat. No. 5,527,491, and U.S. Reissue Patent 36,177 approaches the problem of shipping cold flowing, pressure sensitive hot melt adhesive compositions by designing a package which encloses the pressure sensitive adhesive and is meltable along with the adhesive. In this instance, the package is a polymer based film which will melt when exposed to the heat of application machinery.

In PCT applications WO 02/061009 and WO 04/037671, it is claimed that low temperature adhesive application can be achieved when using low melting point (below 100°C) polymers as packaging films, for example ethylene vinyl acetate (EVA) copolymers, ethylene methyl acrylate (EMA) copolymers, polyethylene copolymers, polypropylene copolymers or combinations thereof.

Yet another approach is to first form the adhesive into a finite size and shape, and then wrap the adhesive with a plastic film. For example, U.S. Pat. No. 6,230,890 describes a method where a mass of adhesive is first cooled, and thereafter packaged in a polymeric shrink wrap film.

In some processes, the adhesive mass is first pumped into a mold and then packaged. For example, U.S. Pat. No. 5,806,285 to Rizzieri teaches a method wherein adhesive is cast in a mold to form blocks. The mold has a plurality of holes formed therein and is lined with a thin film of plastic material which is vacuum thermoformed onto the inner surface of the mold. After filling the mold with adhesive, the open top surface is covered with a thin film of plastic material which is heat sealed to the film lining the interior of the mold. The mold containing the adhesive which is now enveloped by the film is then air cooled prior to removing the packaged adhesive from the mold.

Another process using molds is taught in U.S. Pat. No. 5,401,455 to Hatfield et al. The Hatfield et al patent describes a method for packaging hot melt adhesive compositions using a mold in the form of a pan lined with a film material which has its outer surface in contact with a refrigerant gas or liquid heat sink. Hatfield et al teaches that when molten hot melt adhesive is poured into the lined pan, the adhesive is fused to some degree with the film. According to Hatfield et al this in turn improves later mixing of the film with the adhesive.

Yet another process utilizing a mold is disclosed in U.S. Pat. No. 5,715,654 to Taylor et al. In this process, Taylor et al teaches lining a rigid mold with a thermoplastic film which is vacuum formed into the mold.

Still another process is described in U.S. Pat. No. 4,039,485 and involves the coextrusion of a sheath or coating surrounding a hot melt adhesive where the coextruded sheath material may be polyethylene.

Various other processes for packaging hot melt adhesives are illustrated in U.S. Pat. Nos., 5,373,682, 5,401,455, 6,155,029, 6,138,441, 5,669,207 and 5,942,082.

In all of the references cited above, the material used to package the HIMPSA or other plastic material is a high molecular weight polymer, a modified high molecular weight polymer, or a combination of high molecular weight polymers. Typical examples are high molecular weight ethylene vinyl acetate (EVA) copolymer, or high molecular weight ethylene-acrylate copolymer, or high molecular weight low-density polyethylene, or a high molecular weight metallocene or single-site or Ziegler-Natta copolymer of ethylene. While these materials appear to be somewhat effective for their intended purposes, they also have readily apparent shortcomings which have detracted from their usefulness. These compositions, once melted, have a propensity under certain manufacturing conditions to not homogeneously mix with the hot melt adhesive which was enclosed therein because of the high viscosity of the polymeric material. As a result, these high molecular weight materials may lead to dephasing from the adhesive and therefore form lumps of crosslinked or gelled particles or char, which can clog filters and nozzles in conventional production machinery. Further, experience has shown that the addition of even a few percent, by weight, of these above-identified high molecular weight compositions to a typical hot melt or pressure sensitive adhesive composition has an adverse effect on the ability of the hot melt adhesive to form an effective bond with assorted target substrates. None of the references cited above teach how to formulate a film or coating composition in order to prevent this kind of defect.

Knowing the above shortcomings it has also been suggested to package pressure sensitive hot melt adhesives by formulating a film or a coating composition that is more easily meltable together with and/or more easily blendable into the molten adhesive composition itself just prior to application. The following illustrate some examples of this approach.

In EP 0957029, a coextrusion system is described where a tube of thermoplastic material is extruded and surrounded with a coextruded molten film which is pinched at regular intervals to create individual packages. The coextruded outer film is merely described as being a "non-adhesive" but it is also stated that the film composition may contain 1-5% by weight of the adhesive product.

Another illustration of this approach is shown in U.S. Pat. No. 5,865,927 where the packaging process involves: a) extruding hot melt adhesive through a die, b) spraying the surface of the extruded adhesive with a molten film forming polymeric material, the material being selected so that it will not detract from the properties of the adhesive composition when remelted therewith, c) heating the surface of the coated adhesive at a temperature and for a period of time sufficient to re-melt the film forming polymer so as to form a continuous coating thereof yet insufficient to melt the adhesive, and d) cooling the thus coated adhesive mass to a temperature suitable for handling. The film composition described in the '927 patent uses an EVA copolymer or a SEBS block-copolymer, an aromatic hydrocarbon resin, a paraffin wax, and an antioxidant/stabilizer.

Another example is described in U.S. Pat. Nos. 5,112,552, and 5,292,468, where hot melt adhesive compositions are poured into a mold in the form of a lined pan. The lining is sprayed onto the interior surface of the mold. Examples of the film composition used include an EVA copolymer, polyethylene copolymers, a paraffin wax, waxy forms of antioxidants, ethylene maleic anhydride, ethylene acrylic acid and natural rubbers.

EP 0557573 discloses a packaging composition for cold-flowing hot melt adhesive compositions. The packaging composition contains a blend of styrene-isoprene-styrene block copolymer, an aromatic hydrocarbon resin, mineral oil, a wax, and an antioxidant/stabilizer.

U.S. Pat. Nos. 4,748,796 and 4,755,245 disclose forming a protective coating for an adhesive by electrostatically coating a mold or cavity with a powder screen and then pouring molten hot melt adhesive into the mold. Powder materials are described as made of a wax, or as made of a polymer, or as made of a hot melt formulation, with no further specific formulations described.

Other approaches deal with pellet coating, like in U.S. Pat. No. 6,120,899, where a hot melt composition may be used to coat the pellets. The hot melt composition is described as containing a polymer, tackifying resin, and a small amount of wax. In U.S. Pat. No. 6,238,732, a pelletizing aid containing less than 10 wt % wax is used to coat adhesive pellets. In addition, several underwater pelletizing processes which form pellets of soft or tacky plastic products, like in U.S. Pat. No. 5,041,251, use anti-blocking agents that are applied either by extruding the pellets into a liquid emulsion containing the anti-blocking agent, or applied to the surface of the extruded pellets after the pellets are dried as solid particles. The anti-blocking agent is commonly a mineral powder or micronized wax powder or micronized polymer powder.

In some packaging processes, regardless of the form of the pieces of tacky or soft plastic material to be packaged, the material may be coated with wax, or with low molecular weight ethylene based polymer. In U.S. Pat. Nos. 5,942,304 and 5,733,645, polyethylene wax is used to improve the cuttability of soft and tacky materials. Materials used to form a coating under these conditions, however, typically cannot be formed into a continuous film, substantially surrounding the entire surface of the adhesive or soft plastic material pieces.

In the references cited above, if any benefit can be seen from using a lower-molecular-weight film composition or using a film material, which might include a wax, there are also apparent shortcomings which have detracted from their usefulness. First, wax or wax-based materials are usually too brittle to be formed into continuous films and/or to be used as packaging films as they can not be substantially stretched, folded or pinched without creating cracks and/or breaks therein which would lead to the adhesive or soft or tacky product's leakage from inside the package. This cracking and/or breaking behavior can also happen due to the intrinsic cold flow and subsequent deformation of the adhesive or plastic material during storage or shipment.

Further, none of the formulations containing a wax or lower-molecular-weight compounds described as a protective film in the references cited above would withstand severe shipment and storage conditions like what would be experienced under stacking pressure in a container on a truck, on a train or in a boat, in industrial regions where sunny weather conditions can be around 40° C. to 50° C., even reaching about 60° C. as a peak temperature during several hours. In these conditions, a thermoplastic film would typically have a tendency to get softer, to eventually melt, to become potentially tacky or become progressively plasticized due to the presence of a low molecular weight compound in the packaged material. This is a common failure, particularly in the adhesive industry that needs to be avoided in order to properly handle and use the packaged plastic material. None of the references exhibiting a lower-molecular-weight film or coating composition in the state of the art teaches how to withstand a migration test for a 3 mil thick film exposed during more than 3 days at 60° C., as set forth hereinafter.

Therefore, it has long been known that it would be desirable to have an improved packaging film for enclosing pressure sensitive, cold-flowing, hot melt adhesive compositions or tacky or soft plastic materials. The film material should advantageously be operable to reduce the attendant waste produced as a result of utilizing conventional packaging techniques, and which further reduces or substantially eliminates any troublesome clogging or other deleterious effects which may occur when it is used in combination with conventional adhesive application machinery. Further, the packaging film should have no substantial effect on the ability of the hot melt adhesive composition to form effective bonds on the desired substrates, and should not block to similar films at elevated storage and shipment temperatures. The packaging film should also be inexpensive to manufacture and sell, and further be characterized by its ease of utilization.

SUMMARY OF THE INVENTION

The present invention provides a method for packaging plastic materials like hot melt adhesives using a wax-based polymeric film to surround the plastic material, the resulting package formed thereby, and the film composition used therein. Any process to package the plastic material can be potentially used to form or apply the film around the plastic material. The packaging film is preferably employed for surrounding or enclosing cold flowing, pressure sensitive, hot melt adhesive compositions, but is readily adaptable for packaging other plastic compositions. Also, the packaging film is particularly adapted to a coextrusion process, but is readily adaptable to any process where a film is used to surround or package a plastic material, particularly a hot melt pressure sensitive adhesive composition.

In accordance with the present invention, there is provided a method for packaging a plastic mass of material comprising the steps of providing a plastic mass of finite size and shape, and surrounding the plastic mass with a wax-based polymeric film. In accordance with a preferred embodiment for the method of the present invention, there is provided a method for packaging a plastic mass of material, preferably a hot melt adhesive, comprising the steps of extruding a plastic mass of material, preferably a hot melt adhesive, through a die orifice, and coextruding a polymeric film to surround the plastic mass, preferably the hot melt adhesive. The wax-based polymeric film comprises a composition having at least 25% by weight of a wax material, an enthalpy of fusion of at least about 100 J/g measured by DSC, and an elongation value at break of at least about 100% measured by a conventional film tensile strength test at 2 inch/min. Any type of plastic mass and/or hot melt adhesive formulation can be packaged or surrounded by the polymeric film. Also, the specific enthalpy of fusion desired and/or elongation value at break desired can be adjusted and/or obtained by blending an appropriate amount of partially crystalline ethylene-based polymer together with a thermoplastic elastomeric block copolymer and/or an ethylene based elastomer.

The polymeric film composition used preferably includes at least about 25% by weight of a wax material; about 5% to about 65% by weight of a partially crystalline ethylene-based polymer comprising a homopolymer, a copolymer, a terpolymer or an interpolymer having a melt flow index of 0.05 g/10 min. to 800 g/10 min. at 190° C. and a DSC melting point of about 40° C. to about 130° C.; about 0% to about 40% by weight of a thermoplastic elastomeric block copolymer having a structure A-B, A-B-A, A-(B-A)$_n$-B, or (A-B)$_n$-Y wherein A comprises a polyvinyl aromatic block having a Tg higher than 80° C., B comprises a rubbery midblock having a Tg lower than −10° C., Y comprises a multivalent compound, and n is an integer of at least 3; about 0% to about 25% by weight of an ethylene-based and/or propylene-based elastomer comprising a copolymer or terpolymer having a Tg lower than −10° C.; wherein the amount of partially crystalline ethylene-based polymer, thermoplastic elastomeric block copolymer, and ethylene-based and/or propylene-based elastomer comprises about 30% or more of the total film composition; and wherein the film composition has an enthalpy of fusion of at least about 100 J/g and an elongation value at break of at least about 100%. Combining the wax material and partially crystalline ethylene based polymer together with an amount of a thermoplastic elastomeric block copolymer and an elastomer enables the film composition to provide a desired level of viscosity, flexibility, temperature resistance, migration resistance, and compatibility with the adhesive formulation and still provide desired application characteristics and bonding performances.

The present invention also provides a plastic product package, preferably a hot melt adhesive package. The package includes a plastic mass such as a hot melt adhesive mass, having a finite size and shape, such as a pillow, pellet, or cylindrical shape, and a polymeric film having a wax-based composition as defined above which surrounds the plastic mass or hot melt adhesive mass. Preferably, the polymeric film has a thickness of 10 microns to 1,000 microns.

An advantage of the polymeric film composition of the present invention is that it can be used to package virtually any type of material such as a plastic composition, and particularly a pressure sensitive hot melt adhesive. Another advantage is that the polymeric film composition may be melted and combined with the plastic material, especially when the material is a hot melt adhesive composition, during the manufacturing process, thereby eliminating any waste packaging issues. A further advantage is that the packaging film of the present invention, when combined with a hot melt adhesive composition in a melting pot during the manufacturing application process, is substantially compatible with the adhesive composition itself and therefore does not have any substantial deleterious effects on the physical, or performance characteristics, of the hot melt adhesive composition and does not substantially adversely impact the operation of hot melt application equipment. Another important advantage of the present film composition is that it is substantially resistant to migration therethrough of low molecular weight compounds from the adhesive and/or plastic mass it surrounds or from any external source it might contact, and therefore results in a package which is substantially non-blocking when exposed to environmental conditions, typically 104° F., 122° F. or 140° F. for a few hours to about 7 days or more.

DETAILED DESCRIPTION OF THE INVENTION

Figure 1:
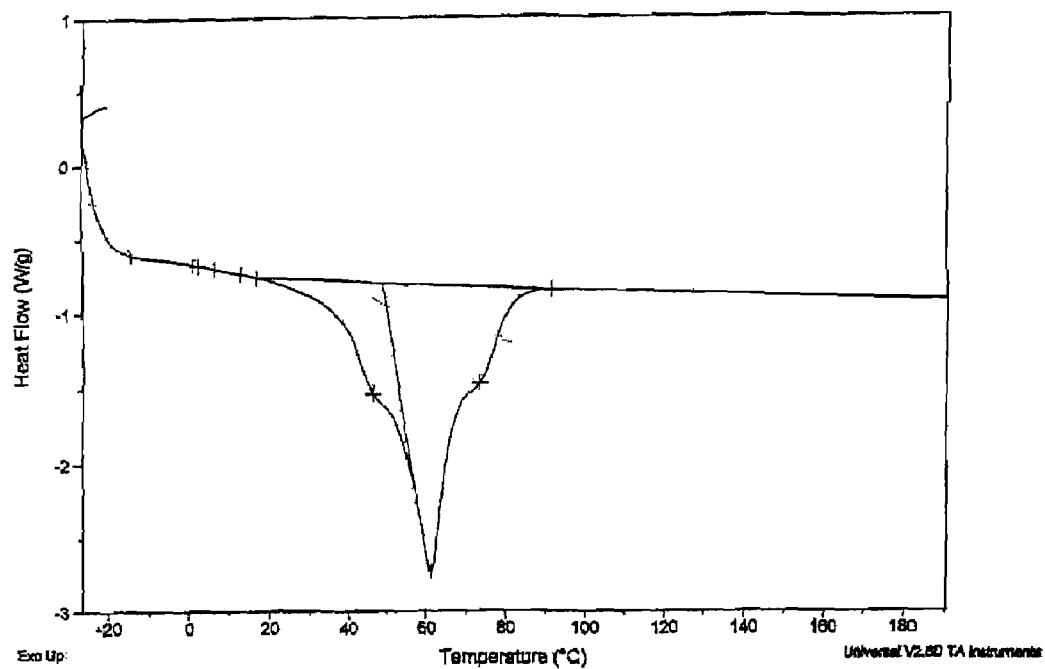
FIG. 1 is a DSC graph of temperature versus heat flow for film composition formula 1601-110F in accordance with the present invention.

The polymeric wax-based film composition of the present invention may be utilized to package virtually any type of plastic material (also oftentimes referred to in this description as a "plastic mass"), especially compositions and compounds, particularly polymers, that are soft, pliable and/or tacky at an ambient temperature of 60° F. As examples, the polymer film composition disclosed herein may be used to package thermoplastic compositions, and is especially intended for packaging hot melt adhesives prepared from polymers, copolymers, terpolymers and interpolymers, block copolymers, elastomers, polyolefins, polyurethanes, styrene, acrylics, vinyl acetates, and polyvinyl alcohol or combinations thereof. More specific examples include hot melt adhesives prepared from (1) rubber polymers such as block copolymers of monovinyl aromatic hydrocarbons and conjugated dienes, e.g., styrene-butadienes (SB), styrene-butadiene-styrene (SBS), styrene-isoprene-styrene (SIS), styrene-ethylene-butylene-styrene (SEBS) and styrene-ethylene-propylene-styrene (SEPS); (2) ethylene-vinyl acetate polymers, ethylene esters and copolymers, e.g. ethylene methacrylate, ethylene n-butyl acrylate and ethylene acrylic acid; (3) polyolefins, e.g. polyethylene and polypropylene; (4) polyvinyl acetate and random copolymers thereof; (5) polyacrylates; (6) polyamides; (7) polyesters; (8) polyvinyl alcohols and copolymers thereof; (9) polyurethanes; (10) polystyrenes; (11) polyepoxides; (12) graft copolymers of vinyl monomers and polyalkylene oxide polymers; and (13) aldehyde containing resins such as phenol-aldehyde, urea-aldehyde, malemine-aldehyde and the like. The polymeric wax-based film composition, however, is not limited to packaging thermoplastic compositions like hot melt adhesives, and the term "plastic" is intended to be much broader in scope. A more complete listing of plastic materials including hot melt adhesive compositions can be found hereinafter in this description.

The polymeric film composition can be utilized with virtually any packaging process where a film is surrounding a plastic material, especially a soft, pliable and/or tacky material such as a hot melt composition, and specifically a hot melt adhesive composition. Thus, the polymeric film composition of the present invention can be utilized with plastic materials which are packaged by extrusion, coextrusion, trays, molds, as well as form, fill, and seal technologies, spray coating, or by any other specific technique, such as those described in the prior art. In fact, the polymeric film composition described herein could even be utilized with hand-wrapping processes. Thus, the polymeric film described herein can be formed simultaneously with the plastic material, as for example in a coextrusion process, or it can be formed separately, stored in roll form and later utilized to package the plastic material, as for example in trays, molds or form, fill and seal technologies. In the latter situation, the film material can be formed into a film (e.g. by extrusion), rolled, stored, shipped and then unwound to package the plastic material.

As used herein, the term "plastic material" or "plastic mass" is intended to describe any natural or synthetic matter, compound or composition that is flowable with or without the application of heat thereto, and that can be molded, cast, squeezed or pressed into various shapes. Thus, the term "plastic material" or "plastic mass" encompasses, but is not limited to, soft and pliable matter, thermoplastic compositions and thermoplastic compounds (e.g. thermoplastic polymers), thermosetting compositions and thermosetting compounds (e.g. thermosetting polymers), hot melt compositions and hot melt compounds (e.g. polymers used in hot melts), as well as hot melt adhesive compositions and hot melt adhesive compounds (e.g. polymers used in hot melt adhesives), and blends of the above materials. It should thus be noted that the terms "plastic mass" and "plastic material" are intended to be broader than what has been called "plastics" as the term "plastics" is typically used to denote mixtures of materials (i.e. a composition), one of which is a natural or synthetic polymer, that are capable of being formed into a fiber, sheet or solid, or cast in a mold, at one stage of processing and subsequently becoming more rigid at another stage.

As used herein, the term "thermoplastic composition" refers to any aggregate, mixture, mass or body formed by combining two or more ingredients which employs a thermoplastic compound as one or more component thereof, and which has the property of softening and becoming moldable when heated and of hardening and becoming relatively more rigid again when cooled, although the degree of rigidity and hardness may vary widely. A thermoplastic compound is any material that becomes or remains soft and moldable when subjected to heat, and becomes harder and relatively more rigid again when cooled, although the degree of rigidity and hardness may vary widely. Typical examples of thermoplastic compounds include any plasticizer, polymer, pre-polymer, terpolymer, interpolymer, monomer or oligomer intended to be transformed or to be added to an end-used product, or to be a raw material for a synthetic or chemical process. Typical thermoplastic compounds include, but are not limited to, acrylonitrile-butadiene-styrene (ABS), acetyls, acrylics, cellulose acetates, cellulose acetate butyrates, nylons, polycarbonates, polyethylenes, polystyrenes, polyvinyl chlorides, polyvinylidene chlorides and tetrafluoroethylenes. The term "thermosetting composition" refers to any aggregate, mixture, mass or body formed by combining two or more ingredients which employs a thermosetting compound as one or more component thereof, and which has the property of becoming permanently hard and rigid when heated or cured. A thermosetting compound is any material that becomes permanently hard and unmoldable when heated or cured. Typical thermosetting compounds include, but are not limited to, alkyds, allylics, epoxies, melamines, ureas, phenolics, polyesters, silicones, and urethanes. The term "hot melt composition" is used to refer to any aggregate, mixture, mass or body formed by combining two or more ingredients and containing thermoplastic materials especially thermoplastic polymers which typically exist as solid masses at ambient temperature and can be converted to a flowable liquid by the direct or indirect application of heat. Such hot melt compositions typically contain a thermoplastic polymer blended together with various conventional ingredients such as plasticizers, waxes, fillers and stabilizers/antioxidants. A "hot melt compound" refers to any of the individual ingredients of a hot melt composition, particularly the polymer component thereof. The term "hot melt adhesive composition" refers to a hot melt composition which is fuirther formulated with tackifying resins in order to improve adhesion and introduce tack into the composition. Such tackifying resins are well known in the art and will be fuirther described hereinafter in this description. A "hot melt adhesive compound" refers to any of the individual ingredients of a hot melt adhesive composition, particularly the polymer or resin components thereof. Thermoplastic compositions, thermosetting compositions, hot melt compositions, and hot melt adhesive compositions are useful in the manufacture of a variety of goods. For example, hot melt adhesives are specifically useful in the manufacture of disposable non-woven articles where bonding of substrates is often necessary, such as disposable diapers, hospital pads, sanitary napkins, panty shields, surgical drapes and adult incontinent briefs. Other diversified applications involve paper products, packaging materials, tapes and labels. In these applications, the hot melt adhesive is heated to its molten state and then applied to a substrate. If a laminate is desired, a second substrate may then be brought into contact against the first substrate to form the laminate. The major advantage of hot melt adhesives is the lack of a liquid carrier, as would be the case of water or solvent based adhesives thereby eliminating costly processes associated with liquid carrier removal.

Although the polymeric film composition of the present invention can be utilized with virtually any packaging process, it is particularly adapted for a coextrusion process. In a coextrusion process, the plastic material to be packaged is generally melt blended in a mixer and then squeezed or extruded through an appropriately sized orifice in a die while still at a temperature above or very close to the softening point of the material. The orifice and die may be of any conventional configuration and generally is such as to provide either a slot like or cylindrical like configuration for the plastic material as it is pumped through the orifice. The temperature of the die must be maintained well above the melting point of the plastic material, and is typically in the range of 100° C. to 215° C. In coextrusion, the polymeric wax-based film material of the above-identified invention is then simultaneously extruded from the die to surround the plastic material to be packaged and thus forms a sheath or wrapping which encloses the material to be packaged. Coextrusion techniques are well known in the art, and suitable equipment for coextrusion processes are described for example in EP 0957029, in U.S. Pat. No. 5,527,491, in U.S. Reissue RE 36,177, and in U.S. Pat. No. 5,942,304. As is well known, since the materials being extruded are at elevated temperatures, the coextrusion process typically occurs under water so that the plastic material and film that surrounds the material begins to cool immediately after being extruded from the die. Thereafter, the plastic material covered by the polymeric film is allowed to cool either in a water bath, or in a refrigerant medium such as chilled glycol, liquid or gaseous nitrogen, compressed carbon dioxide or the like, or under ambient conditions so that the wrapped plastic mass is sufficiently cooled for handling. The coated extrudate can then be pinched mechanically (either when still at an elevated temperature or after cooling to a desired temperature) into a unit of desired size, shape, weight and/or portion using conventional equipment such as rollers, and subsequently sealed if necessary. The seal can be a hermetic seal, or a mechanical seal depending upon the size, shape, weight, and/or portion of the unit, but in any event, should be sufficient to prevent leaking of the plastic material during handling, storage or shipment. Finally, the coated unit mass of plastic material can be cut mechanically or by any other conventional means into individual packaged units using conventional equipment such as water jet, laser or a hot knife.

The resultant packaged plastic mass may be further packaged in a container or bag to reduce its exposure to the environment, moisture, or other contaminants, if necessary or desired. The container or bag could be made of the polymeric wax-based film composition of the present invention or of other film compositions, but if made from other film compositions, such container or bag may then need to be removed by conventional procedures prior to utilization of the individual coated plastic units contained therein, especially if the individual packaged plastic units contain a hot melt adhesive composition intended for use in a melt tank. In contrast, if made of the polymeric wax-based film composition of the present invention, the container or bag could be meltable together with and blendable into the molten adhesive itself just prior to application.

The polymeric wax-based film material described herein can be utilized with a plastic material or mass, such as a thermoplastic composition, a thermosetting composition, a hot melt composition, or a hot melt adhesive composition of any desired size, shape, weight and/or portion to provide a packaged unit. Thus, the packaged unit may be in the form of bricks, blocks, pillows, cartridges, pellets, cylinders, ribbons, or the like. In addition, although it is preferable that the polymeric film of the present invention be compatible with the plastic material which it surrounds, it is not absolutely necessary. Typically, however, the polymeric film composition should have physical characteristics which are compatible with and do not substantially adversely affect the inherent characteristics of a molten mixture of the plastic mass and the polymeric film material, and further the polymeric film material when melted together with the plastic mass which it surrounds to form a mixture is substantially compatible with the operation of application equipment. When the plastic mass is a hot melt adhesive composition, the polymeric film should not substantially adversely affect the adhesive characteristics. However, in certain applications, it may be desirable to simply unwrap the packaged plastic mass prior to use, in which case the polymeric film wrapping could be discarded if desired. Normally, however, the polymeric film composition should be formulated to be compatible with the plastic material it packages so that the polymeric film and plastic material may be blendable together in a molten mixture that is compatible with the operation of application equipment and that does not adversely affect the inherent (especially adhesive) characteristics of the material.

The polymeric film used as the skin material can be colored using any desired pigment or may be printed on using any known printing technique or in general be compounded with any usefuil ingredient therein which is compatible therewith.

The Hot Melt Adhesive

The method and polymeric film composition of the present invention is adaptable to the packaging of virtually any type of plastic material, especially a thermoplastic composition, thermosetting composition, hot melt composition and/or hot melt adhesive composition. It is especially adapted to the packaging of hot melt adhesives, and specifically hot melt pressure sensitive adhesives where the handling problems are most severe. As is well known, hot melt adhesives comprise a blend of various compatible ingredients and typically includes a blend of a polymer and/or copolymer, tackifying resin, plasticizer, filler, wax and an antioxidant. Examples of typically formulations can be found in U.S. Pat. No. 5,149,741 and U.S. Reissue Patent RE 36,177.

Any of a variety of well known and readily available thermosetting materials can be used as the polymer, copolymer or in blends of polymers and/or copolymers in the adhesive compositions. Examples of such materials include polyacrylates, polyesters, polyurethanes, polyepoxides, graft copolymers of one or more vinyl monomers and polyalkylene oxide polymers, aldehyde containing resins such as phenol-aldehyde, urea-aldehyde, melamine-aldehyde and the like, as well as polyamides.

Any of a variety of well known and readily available thermoplastic materials can also be used as the polymer, copolymer or in blends of polymers and/or copolymers in the adhesive compositions. Examples of such materials include ethylene based polymers, including ethylene vinyl acetate, ethylene acrylate, ethylene methacrylate, ethylene methyl acrylate, ethylene methyl methacrylate, an ethylene-styrene interpolymer (ESI), an ethylene acrylic acid, ethylene vinyl acetate carbon monoxide, and ethylene N-butyl acrylate carbon monoxide; polybutene-1 polymers; polyolefins such as high and low density polyethylene; polyethylene blends and chemically modified polyethylene, copolymers of ethylene and $C_1$-$C_6$ mono-or di-unsaturated monomers; polyamides; polybutadiene rubber; polyesters such as polyethylene terephthalate, and polybutylene terephthalate; thermoplastic polycarbonates; atactic polyalphaolefins, including atactic polypropylene, polyvinylmethylether and others; thermoplastic polyacrylamides, such as polyacrylonitrile, and copolymers of acrylonitrile and other monomers such as butadiene styrene; polymethyl pentene; polyphenylene sulfide; aromatic polyurethanes; polyvinyl alcohols and copolymers thereof, polyvinyl acetate and random copolymers thereof; styrene-acrylonitrile, acrylonitrile-butadiene-styrene, styrene-butadiene rubbers, acrylonitrile-butadiene-styrene elastomers, A-B, A-B-A, A-(B-A)$_n$-B, (A-B)$_n$-Y block copolymers wherein the A block comprises a polyvinyl aromatic block such as polystyrene, the B block comprises a rubbery midblock which can be polyisoprene, and optionally hydrogenated, such as polybutadiene, Y comprises a multivalent compound, and n is an integer of at least 3, and mixtures of said substances. Examples of these latter block copolymers including styrene-butadiene, styrene-butadiene-styrene, styrene-isoprene-styrene, styrene-ethylene-butylene-styrene and styrene-ethylene propylene-styrene.

While the total styrene content of the polymers can be as much as 51 wt-% of the polymer, and since the polymers can have more than two A blocks for optimal performance, the total A block should be less than or equal to about 45 wt-% of the polymers, and, most preferably, is less than or equal to 35 wt-% of the polymer. In an S-B-S (styrene-butadiene-styrene) copolymer, the preferred molecular weight is about 50,000 to 120,000, and the preferred styrene content is about 20 to 45 wt-%. In an S-I-S (styrene-isoprene-styrene) copolymer, the preferred molecular weight is about 100,000 to 200,000 and the preferred styrene content is about 14-35 wt-%. Hydrogenating the butadiene midblocks produces rubbery midblocks that are typically converted to ethylene-butylene midblocks.

Such block copolymers are available from Kraton Polymers, Enichem, Atofina Elastomers and Dexco. Multiblock or tapered block copolymers (the A-(B-A)$_n$-B type) are available from Firestone.

Other polymers that could be used are syndiotactic polypropylene (SPP) polymers or isotactic polypropylene random copolymers (RCP) and/or blends of SPP or RCP with amorphous atactic poly-(α-olefins (APAO), all of which are well known in this art. The SPP polymers are essentially high molecular weight stereospecific propylene homopolymers or copolymers of propylene with other α-olefin monomers such as ethylene, butene-1 or hexene-1. RCPs comprise a random copolymer of propylene and an CL-olefin having the formula R—CH═CH$_2$ where R is hydrogen or a $C_2$ to $C_{10}$ alkyl group, preferably ethylene. The useful RCP polymers for the present invention are preferably metallocene catalyzed (MRCP) or single-site catalyzed and will contain at least 1.5% by weight of the said α-olefin comonomer, and having a melting point of about 145° C. or lower, as measured by DSC method, a melt flow rate of 1 to 500 g/10 min. per ASTM Method D-1238, and a solid density of 0.880 to 0.905 g/cc per ASTM Method D-1505. APAO polymers are a family of essentially amorphous low molecular weight homopolymers of propylene or copolymers of propylene with ethylene and/or butene and/or hexene.

The tackifying resins which are used in the adhesives of the present invention are those which extend the adhesive properties and improve the specific adhesion of the polymer. As used herein, the term "tackifying resin" includes:

(a) natural and modified rosin such as, for example, gum rosin, wood rosin, tall-oil rosin, distilled rosin, hydrogenated rosin, dimerized rosin and polymerized rosin;

(b) glycerol and pentaerythritol esters of natural and modified rosins, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall oil rosin and the phenolic modified pentaerythritol ester of rosin;

(c) polyterpene resins having a softening point, as determined by ASTM method E28-58T, of from about 60° C. to 140° C., the latter polyterpene resins generally resulting from the polymerization of terpene hydrocarbons, such as the monoterpene known as pinene, in the presence of Friedel-Crafts catalysts at moderately low temperatures; also included are the hydrogenated polyterpene resins;

(d) copolymers and terpolymers of natural terpenes, e.g. styrene/terpene, α-methyl styrene/terpene and vinyl toluene/terpene;

(e) phenolic-modified terpene resins such as, for example, the resin product resulting from the condensation, in an acidic medium, of a terpene and a phenol;

(f) aliphatic petroleum hydrocarbon resins having Ring and Ball softening points of from about room temperature to 140° C., the latter resins resulting from the polymerization of monomers consisting primarily of olefins and diolefins; also included are the hydrogenated aliphatic petroleum hydrocarbon resins; examples of such commercially available resins based on a $C_5$-olefin fraction of this type are "Wingtack 95" and "Wingtack 115" tackifying resins sold by Goodyear Tire and Rubber Company;

(g) aromatic petroleum hydrocarbons and the hydrogenated derivatives thereof;

(h) aliphatic/aromatic petroleum derived hydrocarbons and the hydrogenated derivatives thereof.

Mixtures of two or more of the above described tackifying resins may be required for some formulations. An example of a commercially available tackifying resin which is useful for the present invention includes the resin which is identified commercially by the trade designation Escorez 5600. This resin is a partially hydrogenated aliphatic aromatic hydrocarbon resin, and is available from Exxon Mobil Chemical Company.

A plasticizer can also be present in the adhesive composition in order to provide desired viscosity control without substantially decreasing the adhesive strength or the service temperature of the adhesive. A suitable plasticizer may be selected from the group which not only includes the usual plasticizing oils, such as mineral oil, but also olefin oligomers and low molecular weight polymers, glycol benzoates, as well as vegetable and animal oil and derivatives of such oils. The petroleum derived oils which may be employed are relatively high boiling temperature materials containing only a minor proportion of aromatic hydrocarbons. In this regard, the aromatic hydrocarbons should preferably be less than 30%, and more particularly less than 15%, by weight, of the oil. Alternately, the oil may be totally non-aromatic. The oligomers may be polypropylenes, polybutenes, hydrogenated polyisoprene, hydrogenated butadiene, or the like having average molecular weights between about 100 and about 10,000 g/mol. Suitable vegetable and animal oils include glycerol esters of the usual fatty acids and polymerization products thereof. Other plasticizers may be used provided they have suitable compatibility. Kaydol, a USP grade paraffinic mineral oil manufactured by Crompton Corporation, has also been found to be an appropriate plasticizer. As will be appreciated, plasticizers have typically been employed to lower the viscosity of the overall adhesive composition without substantially decreasing the adhesive strength and/or the service temperature of the adhesive. The choice of plasticizer can be useful in formulation for specific end uses (such as wet strength core applications).

Waxes can also be used in the adhesive composition, and are used to reduce the melt viscosity of the hot melt construction adhesives without appreciably decreasing their adhesive bonding characteristics. These waxes also are used to reduce the open time of the composition without affecting the temperature performance. Among the useful waxes are:

(1) low molecular weight, that is, 1000-6000 g/mol, polyethylene having a hardness value, as determined by ASTM method D-1321, of from about 0.1 to 120 and ASTM softening points of from about 150° to 250° F.:

(2) petroleum waxes such as paraffin wax having a melting point of from about 130° to 170° F. and microcrystalline wax having a melting point of from about 135° to 200° F., the latter melting points being determined by ASTM method D127-60;

(3) atactic polypropylene having a Ring and Ball softening point of from about 120° to 160° C.;

(4) synthetic waxes made by polymerizing carbon monoxide and hydrogen such as Fischer-Tropsch wax; and (5) polyolefin waxes. As used herein, the term "polyolefin wax" refers to those polymeric or long-chain entities comprised of olefinic monomer units. These materials are commercially available from Eastman Chemical Co. under the trade name "Epolene." The materials which are preferred to use in the compositions of the present invention have a Ring and Ball softening point of 200° F. to 350° F.

(6) metallocene catalyzed propylene-based wax like those commercialized by Clariant under the name "Licocene".

(7) metallocene catalyzed wax or single-site catalyzed wax like for example those described in U.S. Pat. Nos. 4,914,253, 6,319,979 or WO 97/33921 or WO 98/03603. As should be understood, each of these wax diluents is solid at room temperature. Other useful substances include hydrogenated animal, fish and vegetable fats and oils such as hydrogenated tallow, lard, soya oil, cottonseed oil, castor oil, menhadin oil, cod liver oil, etc., and which are solid at ambient temperature by virtue of their being hydrogenated, have also been found to be useful with respect to functioning as a wax diluent equivalent. These hydrogenated materials are often referred to in the adhesives industry as "animal or vegetable waxes."

The adhesive also typically includes a stabilizer or antioxidant. The stabilizers which are useful in the hot melt adhesive compositions of the present invention are incorporated to help protect the polymers noted above, and thereby the total adhesive system, from the effects of thermal and oxidative degradation which normally occurs during the manufacture and application of the adhesive as well as in the ordinary exposure of the final product to the ambient environment. Such degradation is usually manifested by a deterioration in the appearance, physical properties and performance characteristics of the adhesive. A particularly preferred antioxidant is Irganox 1010, a tetrakis(methylene(3,5-di-teri-butyl-4-hydroxyhydrocinnamate))methane manufactured by Ciba-Geigy. Among the applicable stabilizers are high molecular weight hindered phenols and multifunctional phenols, such as sulfur and phosphorus-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5-trimethyl-2,4,6-tris(3-5-di-tert-butyl-4-hydroxybenzyl) benzene;

pentaerythritol tetrakis-3(3,5-di-tert-butyl-4-hydroxyphenyl) propionate;

n-octadecyl-3(3,5-ditert-butyl-4-hydroxyphenyl) propionate;

4,4'-methylenebis(4-methyl-6-tert butylphenol);

4,4'-thiobis(6-tert-butyl-o-cresol);

2,6-di-tert-butylphenol;

6-(4-hydroxyphenoxy)-2,4-bis(n-ocytlthio)-1,3,5-triazine;

2,4,6-tris(4-hydroxy-3,5-di-tert-butyl-phenoxy)-1,3,5-triazine;

di-n-octadecyl-3,5-di-tert-butyl-4-hydroxybenzylphosphonate;

2-(n-octylthio)ethyl-3,5-di-tert-butyl-4-hydroxybenzoate; and sorbitol hexa-(3,3,5-di-tert-butyl-4-hydroxy-phenyl) propionate.

The performance of these stabilizers may be further enhanced by utilizing, in conjunction therewith; (1) synergists such as, for example, as thiodipropionate esters and phosphites; and (2) chelating agents and metal deactivators as, for example, ethylenediaminetetraacetic acid, salts thereof, and disalicylalpropylenediimine.

The adhesive composition useful in the method of the present invention may be produced using any of the techniques known in the art. A representative example of the prior art procedure involves placing all of the substances, in a jacketed mixing kettle, and preferably in a jacketed heavy duty mixer of the Baker-Perkins or Day type, and which is equipped with rotors, and thereafter raising the temperature of this mixture to a range of about 250° F. to 350° F. It should be understood that the precise temperature to be used in this step would depend on the melting point of the particular ingredients. The resulting adhesive composition is agitated until the polymers completely dissolve. A vacuum is then applied to remove any entrapped air.

Optional additives may be incorporated into the adhesive composition in order to modify particular physical properties. These additives may include colorants, such as titanium dioxide and fillers such as talc and clay, crosslinking agents, nucleating agents, reactive compounds, fire-retardant mineral or organic agents, as well as ultraviolet light (UV) absorbing agents and UV fluorescing agents.

The Polymeric Packaging Film

The polymeric film composition of the present invention used as the improved packaging film includes (a) at least 25% by weight of a wax material; (b) about 5% to about 65% by weight of a partially crystalline ethylene-based polymer comprising a homopolymer, a copolymer, a terpolymer or an interpolymer having a melt flow index of 0.05 g/10 min. to 800 g/10 min. at 190° C. and a DSC melting point of 40° C. to 130° C.; (c) about 0% to about 40% by weight of a thermoplastic elastomeric block copolymer having a structure A-B, A-B-A, A-(B-A)$_n$-B, or (A-B)$_n$-Y wherein A comprises a polyvinyl aromatic block having a Tg higher than 80° C., B comprises a rubbery midblock having a Tg lower than −10° C., Y comprises a multivalent compound, and n is an integer of at least 3; (d) about 0% to about 25% by weight of an elastomer comprising a copolymer or terpolymer having a Tg lower than −10° C. wherein the elastomer may be an ethylene-based elastomer, a propylene-based elastomer or a blend of ethylene-based and propylene-based elastomers; (e) wherein the amount of partially crystalline ethylene-based polymer, thermoplastic elastomeric block copolymer, and elastomer comprises about 30% or more of the total film composition; and (f) wherein the film composition has an enthalpy of fuision of at least about 100 J/g measured by DSC, and an elongation value at break of at least about 100% measured by a conventional film tensile strength test at 2 inch/min The wax material component of the packaging film comprises at least about 25% by weight of the packaging film composition. More preferably, the wax material comprises at least about 40% by weight of the film composition with a typical range being about 25% by weight to about 65% by weight.

Among the useful wax materials are:

(1) Low molecular weight, that is, 100-6000 g/mol, polyethylene having a hardness value, as determined by ASTM method D-1321, of from about 0.1 to 120 and ASTM softening points of from about 150° to 250° F.;

(2) Petroleum waxes such as paraffin wax having a melting point of from about 130° to 170° F. and microcrystalline wax having a melting point of from about 135° to 200° F., the latter melting points being determined by ASTM method D127-60;

(3) atactic polypropylene having a Ring and Ball softening point of from about 120° to 160° C.;

(4) metallocene catalyzed propylene-based wax like those commercialized by Clariant under the name "Licocene".

(5) metallocene catalyzed wax or single-site catalyzed wax like for example those described in U.S. Pat. Nos. 4,914,253, 6,319,979 or WO 97/33921 or WO 98/03603.

(6) synthetic waxes made by polymerizing carbon monoxide and hydrogen such as Fischer-Tropsch wax; and (7) polyolefin waxes. As used herein, the term "polyolefin wax" refers to those polymeric or long-chain entities comprised of olefinic monomer units. These materials are commercially available from Eastman Chemical Co. under the trade name "Epolene." The materials which are preferred to use in the compositions of the present invention have a Ring and Ball softening point of 200° F. to 350° F. As should be understood, each of these waxes is solid at room temperature. Other useful substances include hydrogenated animal, fish and vegetable fats and oils such as hydrogenated tallow, lard, soy oil, cottonseed oil, castor oil, menhadin oil, cod liver oil, etc., and which are solid at ambient temperature by virtue of their being hydrogenated, have also been found to be useful with respect to functioning as a wax material equivalent. These hydrogenated materials are often referred to in the adhesives industry as "animal or vegetable waxes".

The preferred wax material is a paraffin wax having a melting point of 60° C. to 70° C., a hard wax such as Paraflint Hi commercialized by Sasol-Schuman, or Bareco PX 100 commercialized by Bareco, those hard waxes having a hardness dmm at 23° C. of about 2 dmm or less and a melting point of 75° C. to 120° C., or blends of a paraffin wax and a hard wax. The preferred hard wax has a melting point lower than 95° C. The term "hard wax" refers to any low molecular weight, highly crystalline ethylene-based polymer.

The partially crystalline ethylene-based polymer component of the packaging film comprises about 5% to about 65% by weight of the packaging film composition. More preferably, the partially crystalline ethylene-based polymer comprises about 15% to about 50% by weight of the packaging film. This partially crystalline ethylene-based polymer component may be a homopolymer, copolymer, terpolymer, interpolymer and/or blends thereof having a melt flow index under 2.16 kg at 190° C. of 0.05 g/10 min to 800 g/10 min, but preferably below 30 g/10 min and most preferably below 7 g/10 min. In addition, this ethylene-based polymer component has a DSC melting point of 40° C. to 130° C., but a preferred melting point below 100° C.

Among the useful partially crystalline ethylene-based polymers are: LDPE, VLDPE, LLDPE, MDPE obtained by ziegler natta catalyst polymerization, or LDPE, EVA, EAA, EMA, EBA, EE2HA, obtained by gas phase random polymerization, or EO, EP, EB, EH, ESI copolymers, obtained by ziegler natta catalyst polymerization or single-site catalyst polymerization or metallocene catalyst polymerization.

One of the preferred polymers is EMA which is readily commercially available as for example from Atofina under the trade designation Lotryl.

Another preferred polymer is single site catalyzed or metallocene catalyzed polymer which is readily commercially available as for example from The Dow Chemical Company under the trade designation Affinity.

The thermoplastic elastomeric block copolymer component of the packaging film comprises about 0% to about 40% by weight of the packaging film composition. More preferably, the elastomeric block co-polymer comprises less that about 15% of the packaging film composition. In addition, the elastomeric block copolymer preferably has a melt flow index lower than 15 g/10 min under 2.16 kg at 190° C.

Among the useful elastomeric block copolymers are those having structure A-B, A-B-A, A-(B-A)$_n$-B, or (A-B)$_n$-Y wherein A comprises a polyvinyl aromatic block having a Tg higher than 80° C., B comprises a rubbery midblock having a Tg lower than −10°C., Y comprises a multivalent compound, and n is an integer of at least 3. Examples of these latter block copolymers including styrene-butadiene (SB), styrene-butadiene-styrene (SBS), styrene-isoprene-styrene (SIS), styrene-isoprene (SI), styrene-ethylene-butylene-styrene (SEBS), styrene-ethylene-butylene (SEB) styrene-ethylene propylene-styrene (SEPS) and styrene-ethylene propylene (SEP).

While the total styrene content of the polymers can be as much as 51 wt-% of the polymer, and since the polymers can have more than two A blocks for optimal performance, the total A block should be less than or equal to about 45 wt-% of the polymers, and, most preferably, is less than or equal to 35 wt-% of the polymer. In an S-B-S (styrene-butadience-styrene) copolymer, the preferred molecule weight is about 50,000 to 120,000, and the preferred styrene content is about 20 to 45 wt-%.

In an S-I-S (styrene-isoprene-styrene) copolymer, the preferred molecular weight is about 100,000 to 200,000 and the preferred styrene content is about 14-35 wt-%. Hydrogenating the butadiene midblocks produces rubbery midblocks that are typically converted to ethylene-butylene midblocks.

Such block copolymers are available from Kraton Polymers, Enichem, Atofina Elastomers and Dexco. Multiblock or tapered block copolymers (the A-(B-A)$_n$-B type) are available from Firestone.

The preferred elastomeric block copolymer is SEBS available from Kraton Polymers under the trade designation Kraton G.

The elastomer component of the packaging film comprises about 0% by weight to about 25% by weight of the packaging film composition. Most preferably, the elastomer comprises about 15% by weight or less of the packaging film composition, and comprises a copolymer or terpolymer having a Tg lower than −10° C. The elastomer may be an ethylene-based elastomer, a propylene-based elastomer, or blends of ethylene-based and/or propylene-based elastomers. The term "ethylene-based" refers to an elastomer where ethylene comprises a portion thereof, and especially where ethylene is the predominant group by weight, and the term "propylene-based" refers to an elastomer where propylene comprises a portion thereof, and especially where propylene is the predominant group by weight, in the polymer.

Among the useful elastomers are EPR rubber, EPDM rubber and/or blends of EPR and EPDM. The term EPR, as used herein, refers to elastomeric copolymers of ethylene and propylene, or such copolymers modified with functional monomers. The functional monomers include a class of unsaturated organic compounds containing one or more functional groups including carboxylic acid group (—COOH), anhydride group (—CO—O—CO—), hydroxyl group (—OH), ether group (—OR, R is a hydrocarbon radical), primary, secondary and tertiary amine groups and ester group. The content of propylene in the copolymer is in the range of 15% to 70% by weight, preferably between 20% to 45% by weight. The term EPDM refers to elastomeric terpolymers comprising of 15% to 70% by weight, preferably between 20% and 45% by weight, of propylene, from 20% to 80% by weight of ethylene and from 2% to 15% by weight of a diene, for example, 1,4-hexadiene, norbornadiene, ethylidene-norbomene, dicyclopentadiene, butadiene and isoprene. The EPDM used here also includes functionally modified versions of terpolymers containing the functional groups herein mentioned above. EPR and EPDM rubbers are commercially available from Exxon Chemical Company under the Vistalon trade name and from DMS Polymers, Inc., under the Kelton trade name. Functionally modified EPDM containing anhydride groups are sold under the trade name Exxelor by Exxon Chemical Company. As can be seen from what is disclosed above, the preferred EPR or EPDM rubber content is between 5% to 65% by weight. Below 5% there is insufficient cohesiveness while above 65% the viscosity of the composition becomes too high. The composition most preferably contains 15% to 40% by weight of EPR, or EPDM, or a mixture thereof.

EPR and EPDM rubbers are readily commercially available as for example under the trade designation "Vistalon" from ExxonMobil Chemical Company, "RexFlex" from Huntsman Corporation, "AdFlex" from Basell Plastics, and "Keltan" from DSM Company, Inc.

The packaging film composition also typically includes a stabilizer or antioxidant. The stabilizers which are useful in the hot melt compositions of the present invention are incorporated to help protect the polymers noted above, and thereby the total adhesive system, from the effects of thermal and oxidative degradation which normally occurs during the manufacture and application of the film composition as well as in the ordinary exposure of the final product to the ambient environment. Such degradation is usually manifested by a deterioration in the appearance, physical properties and performance characteristics of the composition. Any of the stabilizers/antioxidants previously described herein for use with the hot melt adhesive composition may also be utilized in the polymeric film composition. Among applicable stabilizers, a particularly preferred antioxidant is Irganox 1010, a tetrakis (methylene(3,5-di-teri-butyl-4-hydroxyhydrocinnamate)) methane manufactured by Ciba-Geigy.

The packaging film compositions of the present invention may be produced using any of the techniques known in the art. An exemplary procedure involves placing the wax material and all other ingredients in a jacketed, mixing kettle, preferably in a jacketed heavy duty mixer of the Baker-Perkins or Day type, which is equipped with rotors and thereafter raising the temperature to a range of from about 250° to 400° F., and more preferably about 300° F. The precise temperature to be used will depend on the melting point of the particular ingredients. When the initial mixture has been melted and blended, the mixture is blanketed in $CO_2$ at a slow flow rate and the block copolymer is added. The film composition may be pelletized using conventional underwater pelletizing techniques. Other exemplary procedures are using extrusion-compounding with single or double screws.

These film compositions can be easily characterized directly by different conventional analytical methods or after solubilization and/or semi-preparative liquid chromatography followed by a fraction-by-fraction identification, such as Differential Scanning Calorimetry (DSC), Infra-Red (bulk or surface) spectroscopy, steric exclusion chromatography (SEC), TREF i.e. crystallinity-driven driven fractional SEC, Nuclear Magnetic Resonance (NMR).

The viscosity of the improved packaging film of the present invention is about 1000 to about 1,500,000 mPa.s at about 300° F. to about 375° F., as determined by employing a Brookfield Thermocel or other appropriate viscosimeter and utilizing the testing techniques which are set forth in ASTM Method D3236-73. Once mixed and equilibrated, the molten packaging film of the present invention can be coextruded along with the thermoplastic composition, as previously described herein, or can be formed into a film by casting or extruding the molten composition onto a release coated surface. Commercially available machinery for performing these manufacturing techniques may be purchased from The Nordson Company. As earlier discussed, the packaging film enclosing the hot melt adhesive composition may be charged directly to the melt tank of a commercial hot melt application machine thereby eliminating any waste and avoiding many of the shortcomings attendant to the use of the conventional packaging techniques discussed earlier.

The new packaging film composition may be used virtually in any packaging techniques. For example it may be sprayed or poured onto adhesive pieces in general, or adhesive blocks, or into molds, or transformed into a form of package item, like a bag, a thermoformed tray or a wrapping film or sheet.

Particularly the new film composition may be processed to form a film by conventional film-extrusion or film-coextrusion techniques, like extrusion-coating, cast-extrusion, blown-extrusion. The new film composition may be compounded with conventional additives in order to improve its processability in these traditional film forming techniques, and to improve film mechanical and physical final characteristics. In these processes, the film is generally extruded then stretched and cooled, slit and wound upon itself to form rolls for storage and subsequent use in commercially available filling and wrapping machinery. In this regard, the improved packaging film of the present invention can be utilized on semi-automatic multi-size filling and wrapping machines such as those manufactured under the trade designation "Mark 10I-12-A system: Inverted Horizontal Form, Fill and Seal Machine", and which is manufactured by Premier Packing Systems, Inc. of Waukesha, Wis. Other compatible machinery may be easily selected by those skilled in the art.

EXAMPLES

Film material samples were prepared with the ingredients and mixing procedures described herein below. A total of 250 grams each were made and the mixing was carried out at about 300 to 400° F. under carbon dioxide atmosphere in a laboratory type mixer what consists of a propeller powered by a motor, a heating mantle, a temperature control unit and a container of about 1 pint in size. The appropriate amounts of each component, calculated according to the ratios shown in the tables below, were added to the container in an appropriate sequence to allow mixing while limiting the heat or shear degradation of ingredients. After the ingredients in the container were completely melted and mixed thoroughly to allow a good visual homogeneity, samples were stored appropriately to be tested.

Film samples were made on a Meltex CL 104 lab-scale coater fitted with an EP-11 slot die nozzle in 2-in width and 3-mils or 6-mils thickness, coated on siliconed release paper. Temperature was from 250 to 375° F., depending on the viscosity level of the film material, and rolling speed was about 2 linear meters per minute. Any test performed on film samples was made at least 24 hours after the film was made. The term "mil" represents a thickness value of one thousandth of an inch corresponding to $25.4 \times 10^{-6}$ meters.

Tensile strength of film materials were performed according to test method ASTM D-638 at various temperatures, typically −20° C. and 20° C. at 2 inch/min. Samples are made from 6-mils or 3-mils thick films and have "dog-bone" curved shape with no sharp cut on the edges to initiate no tear effect during measurement. Elongation value at break is reported as average on 3 to 5 samples. This test is aimed to simulate the mechanical stress that may endure the packaged material, and the skin material itself.

Blocking tests were performed in the following manner: square surfaces of 2 inch by 2 inch of film were put in contact to each other under a load pressure of about 2 psi, and put in the oven at 50, 60 or 70° C. during 4 hours, 24 hours, or 7 days. After allowing the samples to cool down, visual observation was made if no or little or moderate or strong force was needed by hand to separate surfaces from each other. This test is made to simulate possible weather conditions where the adhesive package can be stored or shipped.

Migration tests were performed on 3-mils or 6-mils films at 40, at 50 or at 60° C. Film samples are put in contact with some adhesive material. Two different adhesive compositions were selected for their content in migrant species and their specific ability to allow migrant species to go through a film material over time. A square surface of 2 inch by 2 inch of film was put in contact of a adhesive piece. The piece of adhesive was a parallelepipedic form which larger base was 1 inch by 1 inch, and height of about a quarter of an inch. The larger base of the adhesive piece is placed in the center of the film square. Another film square is put on the top of the adhesive piece, and this top square is made of a low temperature heat sealable material. With light heat provided by a hot air gun, this material is sealed to the edges of the bottom square film, in order to contain any leakage of the adhesive piece due to intrinsic adhesive flow with time or increased temperature. Such "pillows" are put in the oven during few days, typically 3 to 21 days. When removed from the oven after a certain number of days, observations are made at room temperature visually or by finger contact: staining of the film, friction with no pressure, tack to finger or tack to itself. This test is aimed to simulate the ability of the film material to resist migration from typical hot melt compositions in storage or shipment conditions.

DSC test method was performed on film compositions in accordance with test method ASTM D-3417, with sweeping rates of 20° C. per minutes on a DSC instrument model 2010 from TA Instruments based in New Castle, Del. Three temperature sweeps are performed consecutively on a 5 to 10 mg sample under a nitrogen atmosphere from −100° C. till 200° C., then from 200° C. to −100° C., then again from −100° C. till 200° C. This last sweep shows a reproducible measurement of the enthalpy of fusion of the film composition expressed in Joule per gram of material. "Enthalpy of fusion" is sometimes also referred to as "melting capacity" and/or "specific heat capacity" by those skilled in this art.

Hot melt adhesive were prepared with the ingredients and mixing procedures described herein below. A total of 2000 grams each were made and the mixing was carried out at about 300° F. to 375° F. under carbon dioxide atmosphere in a laboratory type mixer what consists of a propeller powered by a motor, a heating mantle, a temperature control unit and a container of about 1 gallon in size. The appropriate amounts of each component, calculated according to the ratios shown in the tables below, were added to the container in an appropriate sequence to allow mixing while limiting the heat or shear degradation of ingredients. After the ingredients in the container were completely melted and mixed thoroughly to allow a good visual homogeneity, samples were stored appropriately to be tested.

Dissolution tests of the skin materials into the adhesive melt were conducted in the lab on 2000 g adhesive samples. Depending on each case studied, a precise amount, typically 20 g or 40 g of a 6-mils-thick film of the film material was put in the molten adhesive at the considered adhesive application temperature, typically 275° F. to 350° F. After a period of 30 minutes with no movement in an air-circulating oven, visual observation was made of the molten aspect. A smooth agitation performed by hand with a stainless steel bar at about 60 rpm during 10 rounds allowed to visually assess the dissolvability. After another 30 minutes period in the oven, if still non-homogeneous aspect were observed visually or with a stainless steel bar, further agitation were conducted with a powered 3-blades propeller at 50 rpm. Observation was made after every 30 minutes. Each time a dissolution test was performed, a blank sample of adhesive was taken for reference.

Brookfield viscosity was tested according to ASTM D-3236 Method at elevated temperature. Tests were performed on blank adhesive samples in the same time as on contaminated adhesive samples produced in the dissolution test described above.

Ring & Ball softening point was determined with an automated Herzog unit according to ASTM E-28 method. Tests were performed on blank adhesive samples in the same time as on contaminated adhesive samples produced in the dissolution test described above. Adhesive formulas used for this migration test were made according to the mixing procedure described above. One composition was called "high oil content adhesive", made of 22% Nyplast 222B, 57% Escorez 5600, 20% Vector 4213, 1% Irganox 1010 in weight. Another composition was called "rosin-ester containing adhesive" and was made of 18% Nyplast 222B, 59% Sylvatac RE 100, 22% Vector 4215, 1% Irganox 1010 in weight.

Ageing tests of adhesive formulations were performed at 350° F. on 200 g samples put in a loosely covered 400 g-glass jar, in a ventilated oven. Visual observations were made after 3 days at 350° F. if any char, gelling, skin, sedimentation, or dephasing occurred. Tests were performed on blank adhesive samples in the same time as on contaminated adhesive samples produced in the dissolution test described above.

Laminated specimens were formed by using a Nordson Meltex CT225 hot melt high speed coater. When spiral spray technique was used, the coater was fitted with a 0.018 inch spiral spray extrusion nozzle available from Nordson Corporation. When slot coat technique was used, the coater was fitted with a EP-11 slot die extrusion nozzle available from Nordson Corporation. Adhesives were spiral sprayed at various coating weights, depending on the application required, with different open times—typically 0.1 to 0.5 seconds—to the 1-bar-nip rolls compression. Application temperature was set between 275° F. and 350° F. depending on the application requirements. Lamination process was performed on blank adhesive samples in the same time as on contaminated adhesive samples produced in the dissolution test described above.

Standard polypropylene-based spun-bond non-woven web is available from BBA Corporation at 15.7 gram per square meter coating weight. Standard polyethylene non-breathable white film at 17 gram per square meter is available under trade name DH-216 from Clopay Corporation.

Peel strength was measured in the machine direction in 180° geometry with a tensile tester (Instron Model 55R1122) in the controlled atmospheric environment (20° C. and 50% relative humidity). Prior to the test, the specimens were conditioned at the controlled environment for approximately 12 hours to ensure the reproducibility and accuracy of the data. The test was done at a cross-head speed of 12 inches/min. The average peel value over the displacement of six replicates, normalized to g/in unit, was reported as the peel strength. Tests were performed on blank adhesive samples in the same time as on contaminated adhesive samples produced in the dissolution test described above.

Creep Resistance test was carried out with the laminated specimens containing elastic strands. To prepare the specimen, three elastic strands (Lycra 151 or 262 at 740 dtex basis weight available from Dupont), which were stretched to 300% elongation, were either laminated between a layer of 1.0 mil thick white or printed polyethylene film and a layer of polypropylene spunbond nonwoven fabric web. The different parts of the laminated specimen, said films or webs and stretched elastic strands, have been glued together by the hot melt adhesive with the spiral spray technique, and the creep test is intended to be a measurement of the quality of the bond effectively done by the hot melt composition. The specimen, cut to about 350 mm in length, was stretched out completely and its ends were securely attached to a piece of rigid board. A length of 300 mm was marked machine direction and the elastic strands were cut at the marks. The specimen was then placed in an air-circulating oven at 100° F. Under these conditions, the elastic strands under stretch can retreat to a certain distance. The distance between the ends was measured after four hours. The ratio of the final length to the initial length, defined as Creep Retention and expressed in percentage (%), is a measure of the ability of the adhesive to hold the elastic strands. Tests were performed on blank adhesive samples in the same time as on contaminated adhesive samples produced in the dissolution test described above.

Sprayability was evaluated during the coating process on a Nordson Meltex CT225 hot melt high speed coater by observing visually the regularity of the spiral pattern shape in time and space. The coating conditions varied depending on the adhesive sample. Tests were performed on blank adhesive samples in the same time as on contaminated adhesive samples produced in the dissolution test described above.

Dissolution test was performed on a low viscosity SIS-based HMPSA, H2548-01, available from Bostik Findley for PSA label end-use. The sample was then slot-coated on paper at 300° F. to get a 1-mil coating, and PSA performances were evaluated in comparison with H2548-01 with no skin material, 24 hours after the coating has been made. The SAFT value was measured according to test method PSTC-7 with a 1.6° C./min ramp, on 1-inch per 1-inch surface area of coating laminated toward stainless steel with a 4.5 lbs rubber roller in one pass at low speed. The peel force, as average value or peak value over displacement was evaluated on 1-inch-wide, 5-inch-long surface laminated to stainless steel in the same way as for SAFT test, and according to test method PSTC-1 and ASTM D3330. Loop tack value was measured according to test method ASTM D6195 towards stainless steel, and average value over displacement is reported. For each of these tests, 3 replicates at least were done.

The following abbreviations are used throughout this specification:
PE—polyethylene
PP—polypropylene
LDPE—low density polyethylene
HDPE—high density polyethylene
VLDPE—very low density polyethylene
LLDPE—linear low density polyethylene
MDPE—medium density polyethylene
EVA—ethylene vinyl acetate
EAA—ethylene acrylic acid
EMA—ethyl methacrylate
EBA—ethylene butyl acrylate
EE2HA—ethylene-2-ethyl-hexyl-acrylate
E—ethylene-octene
EP—ethylene-propylene
EB—ethylene-butadiene
EH—ethylene-hexene
ESI—ethylene-styrene interpolymer
EPR—ethylene-propylene rubber
EPDM—ethylene-propylene-diene-monomer
SB—styrene-butadiene
SBS—styrene-butadiene-styrene
SIS—styrene-isoprene-styrene
SEBS—styrene-ethylene-butylene-styrene
SEPS—styrene-ethylene-propylene-styrene
SBBS—styrene-butadiene-butylene-styrene
SIBS—styrene-isoprene-butlylene-styrene
SEP—styrene-ethylene-propylene
APAO—atactic poly-alpha-olefins
SPP—synd.iotactic polypropylene
IPP-isotactic polypropylene
RCP—isotactic polypropylene random copolymers
MMA—methyl methacrylate Materials used in the film compositions of the following Examples are described as below:

155 PARAFFIN WAX is a 65.5° C. melting point paraffin wax and is available from Sasol Wax Americas, Inc.

138 PARAFFIN WAX is Paraffine 58-60 available from Total S.A.

158 PARAFFIN WAX is Paraffine 68-70 available from Total S.A.

PARAFLINT C80 is a Fisher-trops wax available from Sasol Wax Americas, Inc.

POLYWAX 655 is a synthetic polyethylene wax available from Baker Petrolite, Inc.

KAYDOL USP 35 MINERAL OIL is available from Crompton Corporation.

ESCOREZ 5320 and ECR-188 are both polycyclic tackifying resins available from Exxon Mobil Chemicals.

SYLVATAC RE 100 is a rosin ester tackifying resin available from Arizona Chemicals, Inc.

WINGTACK EXTRA is a aliphatic hydrocarbon tackifying resin. It is available from Goodyear Chemicals, Akron, Ohio.

PICCOTEX 120 is aromatic hydrocarbon tackifying resin available from Eastman Chemical.

EVATANE 18-150 and EVATANE 28-06, LOTRYL 37EH175, LOTRYL 37EH550, LOTRYL 09 MG 02, LOTRYL 15 MA 03, LOTRYL 24 MA 07, LOTRYL 24MA005, LOTRYL 17BA07, LOTRYL 35 BA 320 are EVA or EMA or EBA copolymers available from Atofina Chemicals, Inc., Philadelphia, Pa.

EPOLENE C-13 and EPOLENE C-17 are LDPE grades available from Eastman Chemical.

ExxonMobil LD 202 is a LDPE available from Exxon Mobil Chemicals.

AFFINITY PL 1280, AFFINITY SM 1300, AFFINITY EG8150 are single-site copolymers of ethylene available from Dow Chemicals.

ELVALOY 1609 AC is an EVA copolymer available from Dupont Chemicals.

VECTOR 4411 is an SIS block-copolymer available from Dexco.

KRATON G 1650, KRATON G 1652, KRATON G-1657 are SEBS block copolymers available from Kraton Polymers.

IRGANOX 1010 Irganox 1010 is a hindered phenol type of antioxidant obtained from Ciba-Specialty Chemicals, Tarryton, N.Y.

The invention is further illustrated by way of the examples which are set forth below.

Example 1

Tables 1a and 1b illustrate 19 different compositions suitable for use as the polymeric outer film. Each formulation in Tables 1a and 1b had an elongation value at break of greater than 100%, and a melting capacity greater than 100 J/g. Each formulation also had excellent migration resistance because they had little or no tack, little or no staining and were non-blocking under the test conditions described.

Example 2

Tables 2a and 2b illustrate 15 different compositions that are unsuitable for use as the polymeric outer film. The formulations in Tables 2a and 2b were all unsuitable because they did not pass one or more of the elongation, melting capacity or migration resistance tests. In other words, each formulation in Tables 2a and 2b have one or more characteristic resulting in the composition having an elongation value at break of less than 100%, a melting capacity of less than 100 J/g, or poor migration resistance as evidenced by excessive tack and/or staining.

Example 3

Figure 2:
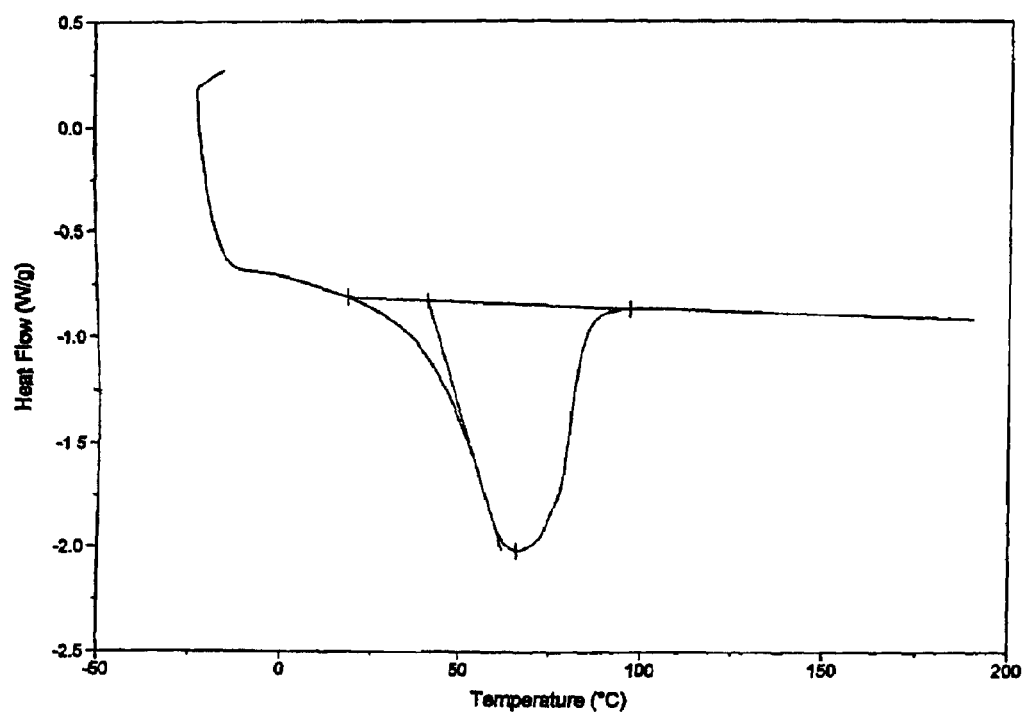
FIG. 2 is a DSC graph of temperature versus heat flow for film composition formula 1601-155E in accordance with the present invention.
Figure 3:
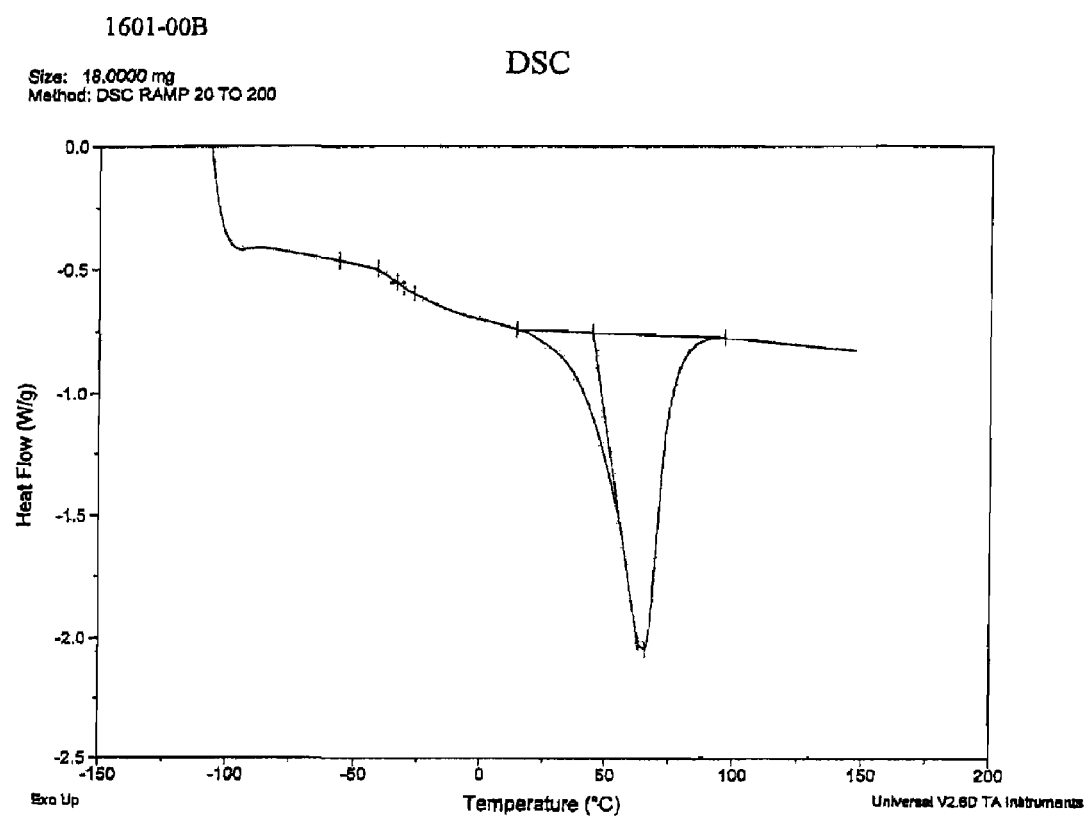
FIG. 3 is a DSC graph of temperature versus heat flow for film composition 1601-00B which is outside the desired performance characteristics for a packaging film in accordance with the present invention.
Figure 4:
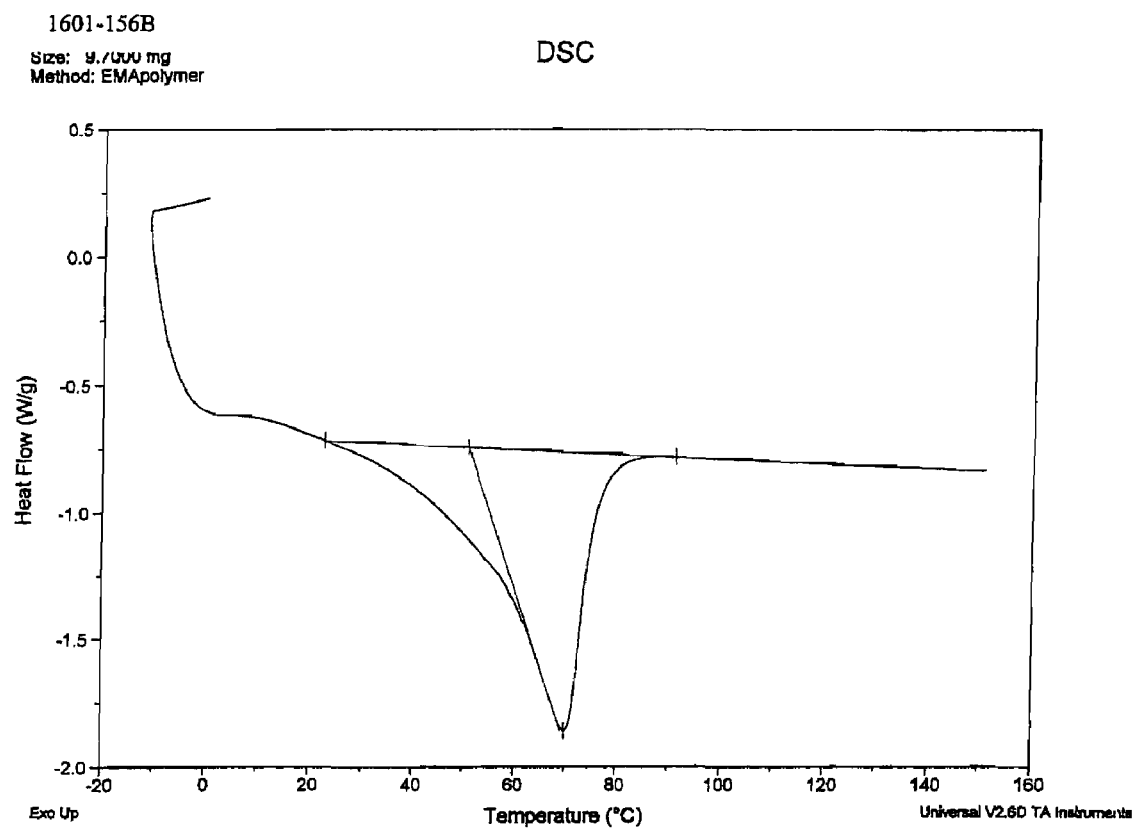
FIG. 4 is a DSC graph of temperature versus heat flow for film composition 1601-156B which is outside the desired performance characteristics for a packaging film in accordance with the present invention.

Tables 3a and 3b illustrate a comparison of the ingredients of various formulations and the test data obtained with regard to suitable formulas for the outer film and unsuitable formulas based on DSC data and on migration resistance at 50° C. Also, FIGS. 1 and 2 illustrate the DSC curves for two acceptable compositions while FIGS. 3 and 4 illustrate the DSC curves for two unacceptable compositions. FIG. 1 illustrates heat flow versus temperature for formulation 1601-110F from which its enthalpy of fusion is measured to be 117 Joules/gram. FIG. 2 illustrates heat flow versus temperature for formulation 1601-155E from which its enthalpy of fusion is measured to be 109 Joules/gram. FIG. 3 illustrates heat flow versus temperature for formulation 1600-00B from which its enthalpy of fusion is measured to be 87 Joules/gram. Finally, FIG. 4 illustrates heat flow versus temperature for formulation 1601-156B from which its enthalpy of fusion is measured to be 73 Joules/gram. Reference should also be made to Table 3b for a comparison of these measured enthalpies of fusion. Table 3 also provides the corresponding enthalpies of fusion calculated from the raw materials values.

Example 4

Tables 4a and 4b illustrate the dissolution of film composition 1416-75B and 1601-00A compared to a 2 mil-thick EVA film, where VA content in weight is about 3%. This film is commercially available from Armin Plastics-Jersey City, N.J. Adhesive used is H2543, a typical SIS-based adhesive commercially available from Bostik Findley, Inc. and applied at temperature around 300° F. This kind of EVA-based film can be used to produce hot melt adhesive cartridges in a form-fill-and-seal process, but as seen in Tables 4a and 4b, may present problems of adhesive stability, as other formulated formulas are more compatible with the adhesive system, due to the presence of low molecular weight compounds into the skin material composition.

Example 5

Table 5 illustrates the adhesive properties of H2543, and demonstrates that the peel force performances are not affected by up to 2% of the outer film material. Sprayability is also not affected by the presence of the skin material in the adhesive formulation.

Example 6

Table 6 illustrates the adhesive properties of H2994, and demonstrates that the elastic creep performances are not affected by up to 2% of the film material. H2994 is a typical SIS-based adhesive commercially available from Bostik Findley, Inc. Sprayability is also not affected by the presence of the skin material in the adhesive formulation.

Example 7

Table 7 illustrates the adhesive properties of H2548-01, and demonstrates that the various adhesive performances are not significantly deteriorated by up to 2% of the film material. H2548-01 is a typical SIS-based adhesive commercially available from Bostik Findley, Inc.

TABLE 1a

| | enthalpy of fusion of raw materials (J/g) | suitable formulas | | | | | | | | |
|---|---|---|---|---|---|---|---|---|---|---|
| | | 1416-75B | 1601-74C | 1601-82B | 1601-82C | 1601-82D | 1601-84B | 1601-84C | 1601-86C | 1601-86H |
| 155 PARAFFIN WAX (65.5 deg C.) | 218.7 | 15 | | | | | | | | |
| 138 PARAFFIN WAX (58-60 deg C.) | 204.1 | | | | | | | | | |
| 158 PARAFFIN WAX (68-70 deg C.) | 211.7 | | 15 | 15 | 40 | 0 | 15 | 30 | 15 | 21 |
| PARAFLINT C80 | 226.7 | | 15 | 25 | | | 25 | 15 | 22 | 25 |
| POLYWAX 655, PRILLED | 239 | 24 | | | 0 | 40 | | | | |
| ESCOREZ 5320 | 0 | | | | | | | | | |
| WINGTACK EXTRA | 0 | | | | | | | | | |
| ECR-188 | 0 | | | | | | | | | |
| EVA 18-150 | 60 | | | | | | | | 8 | |
| EVATANE 28-06 | 35 | | | | | | | | | |
| EPOLENE C-13 | 94 | | | | | | | | | |
| EPOLENE C-17 | 80 | | | | | | | | | |
| E82onMobil LD 202 | 80 | | | | | | | | | |
| AFFINITY PL 1280 | 77.3 | | | | | | | 25 | | |
| AFFINITY SM 1300 | 82.1 | | | | | | 20 | | | |
| AFFINITY EG8150 | 40 | | | | | | | | | |
| ELVALOY 1609 AC | 82 | | | | | | | | | |
| LOTRYL 37EH175 | 30 | | | | | | | | | |
| LOTRYL 37EH550 | 30 | | | | | | | | | |
| LOTRYL 09 MG 02 | 82.4 | | | | | | | | | |
| LOTRYL 15 MA 03 | 65.3 | 60 | | 59 | 59 | 59 | 39 | 29 | 54 | 47 |
| LOTRYL 24 MA 07 | 39 | | | | | | | | | |
| LOTRYL 24MA005 | 42 | | | | | | | | | |
| LOTRYL 17BA07 | 65 | | 69 | | | | | | | |
| LOTRYL 35 BA 320 | 45 | | | | | | | | | |
| KRATON G 1650 | 0 | | | | | | | | | |
| KRATON G 1652 | 0 | | | | | | | | | 6 |
| KRATON G-1657 | 0 | | | | | | | | | |
| IRGANOX 1010-DD TIN FREE | 0 | 1 | 1 | 1 | 1 | 1 | 1 | 1 | 1 | 1 |
| total | | 100 | 100 | 100 | 100 | 100 | 100 | 100 | 100 | 100 |

| | enthalpy of fusion of raw materials (J/g) | suitable formulas | | | | | | | | |
|---|---|---|---|---|---|---|---|---|---|---|
| | | 1601-88F | 1601-88G | 1601-96E | 1601-96F | 1601-162A | 1416-76J | 1601-38D | 1601-56A | 1601-56B | 1601-73C |
| 155 PARAFFIN WAX (65.5 deg C.) | 218.7 | | | | | | 64 | 15 | 15 | 15 | |
| 138 PARAFFIN WAX (58-60 deg C.) | 204.1 | | | | | | | | | | |
| 158 PARAFFIN WAX (68-70 deg C.) | 211.7 | 30 | 40 | 30 | 25 | 25 | | | | | 15 |
| PARAFLINT C80 | 226.7 | | | 16 | 25 | 25 | | | | | 15 |
| POLYWAX 655, PRILLED | 239 | | | | | | | 24 | 24 | 24 | |
| ESCOREZ 5320 | 0 | | | | | | | | | | |
| WINGTACK EXTRA | 0 | | | | | | | | | | |
| ECR-188 | 0 | | | | | | | | | | |
| EVA 18-150 | 60 | | | | | | | | | | |
| EVATANE 28-06 | 35 | | | | | | | | | | |
| EPOLENE C-13 | 94 | | | | | | | | | | |
| EPOLENE C-17 | 80 | | | | | | | | 20 | | |
| E82onMobil LD 202 | 80 | | | | | | | | | 20 | |
| AFFINITY PL 1280 | 77.3 | | 20 | | | 25 | | 40 | 40 | 40 | 39 |
| AFFINITY SM 1300 | 82.1 | | | | | | | 20 | | | 30 |
| AFFINITY EG8150 | 40 | | | | | | | | | | |
| ELVALOY 1609 AC | 82 | 69 | 39 | | | | | | | | |
| LOTRYL 37EH175 | 30 | | | | | | | | | | |
| LOTRYL 37EH550 | 30 | | | | | | | | | | |
| LOTRYL 09 MG 02 | 82.4 | | | | | | | | | | |
| LOTRYL 15 MA 03 | 65.3 | | | 43 | 34 | 15 | | | | | |
| LOTRYL 24 MA 07 | 39 | | | | | | | | | | |
| LOTRYL 24MA005 | 42 | | | | | | | | | | |
| LOTRYL 17BA07 | 65 | | | | | | | | | | |
| LOTRYL 35 BA 320 | 45 | | | | | | | | | | |

TABLE 1a-continued

| | | | | | | | | | | |
|---|---|---|---|---|---|---|---|---|---|---|
| KRATON G 1650 | 0 | | | | | | 35 | | | |
| KRATON G 1652 | 0 | | | 10 | 15 | | | | | |
| KRATON G-1657 | 0 | | | | | 10 | | | | |
| IRGANOX 1010-DD TIN FREE | 0 | 1 | 1 | 1 | 1 | 1 | 1 | 1 | 1 | 1 |
| total | | 100 | 100 | 100 | 100 | 100 | 100 | 100 | 100 | 100 |

TABLE 1b

| | suitable formulas | | | | | | | | |
|---|---|---|---|---|---|---|---|---|---|
| | 1416-75B | 1601-74C | 1601-82B | 1601-82C | 1601-82D | 1601-84B | 1601-84C | 1601-86C | 1601-86H |
| Brookfield Viscosity of the protector material at 350 deg F. in mPa · s | 115000 | 171000 | 107300 | 102000 | 119100 | 74800 | 82100 | 120500 | 65750 |
| tensile test of the material | | | | | | | | | |
| elongation (%) | 260 | 440 | 430 | 379 | 505 | 275 | 445 | 493 | 509 |
| std dev (%) | 60 | 154 | 80 | 106 | 69 | 60 | 141 | 25 | 13 |
| enthalpy of fusion (calculation from raw materials' values) in J/g | 129 | 110 | 126 | 123 | 133 | 130 | 135 | 121 | 131 |
| DSC enthalpy of fusion in J/g | 127 | 109 | 128 | 118 | 134 | | 129 | 102 | 126 |
| blocking tests at 70 deg C./6 mils after 1 day | none | none | none | none | none | none | none | none | none |
| migration at 60 deg C./6 mils after 14 days on a 1-in2-wide contact area with HMPSA products | | | | | | | | | |
| high oil content adhesive staining | middle | middle | low to middle | low to midddle | middle | middle | low | middle | low |
| tack | none to low | none to low | none to low | none to low | none to low | none to low | none to low | none to low | none to low |
| rosin ester containing adhesive staining | low | middle | low | low | low | low | low | middle | low |
| tack | none to low | none to low | none to low | none to low | none to low | none to low | none to low | none to low | none to low |

| | suitable formulas | | | | | | | | |
|---|---|---|---|---|---|---|---|---|---|
| | 1601-88F | 1601-88G | 1601-96E | 1601-96F | 1601-162A | 1416-76J | 1601-38D | 1601-56A | 1601-56B | 1601-73C |
| Brookfield Viscosity of the protector material at 350 deg F. in mPa · s | 170000 | 86100 | 91500 | 78200 | 35450 | 48000 | 89870 | 108200 | 119200 | 155200 |
| tensile test of the material | | | | | | | | | | |
| elongation (%) | 442 | 207 | 564 | 600 | 686 | 678 | 220 | 350 | 410 | 617 |
| std dev (%) | 25 | 90 | 51 | 60 | 12 | 34 | 60 | 100 | 110 | 77 |
| enthalpy of fusion (calculation from raw materials' values) in J/g | 120 | 132 | 127 | 131 | 139 | 141 | 138 | 137 | 137 | 120 |
| DSC enthalpy of fusion in J/g | 109 | | | 120 | | | | 125 | | 114 |
| blocking tests at 70 deg C./6 mils after 1 day | none | none | none | none | none | none | none | none | none | none |
| migration at 60 deg C./6 mils after 14 days on a 1-in2-wide contact area with HMPSA products | | | | | | | | | | |
| high oil content adhesive | low | low | low | low | none to low | low | none to low | none to low | none to low | none to low |
| | none to low | none to low | none to low | none to low | none to low | none to low | none to low | none to low | none | none |
| rosin ester containing adhesive | middle | middle | low | low | none to low | none to low | none to low | none to low | none to low | none to low |
| | none to low | none to low | none to low | none to low | none | none to low | none to low | none to low | none | none |

TABLE 2a

| | enthalpy of fusion of raw materials | formulas unsuitable because of migration resistance and DSC fusion specific heat | | | | | | | formulas unsuitable because elongation is not high enough in tensile strength test | | | | | | | |
|---|---|---|---|---|---|---|---|---|---|---|---|---|---|---|---|---|
| | | 1601-00A | 1601-00B | 1601-88A | 1601-88B | 1601-156C | 1601-156D | 1601-156B | 1416-75D | 1601-25A | 1601-25D | 1601-68E | 1601-84F | 1601-21D | 1601-21E | 1601-21F |
| 155 PARAFFIN WAX (65.5 deg C.) | 218.7 | 10 | | | | | | | 15 | 15 | 13 | | | 12.3 | 15 | 16.0 |
| 138 PARAFFIN WAX (58-60 deg C.) | 204.1 | | | | | | | | | | | | | | | |
| 158 PARAFFIN WAX (68-70 deg C.) | 211.7 | | 35 | 20 | 20 | 39 | 40 | 33 | | | | 20 | 15 | | | |
| PARAFLINT C80 | 226.7 | | | 10 | 10 | | | | | | | 20 | 15 | | | |
| POLYWAX 655, PRILLED | 239 | | | | | | | | 24 | 40 | 22 | | | 49.5 | 54 | 62.0 |
| KAYDOL USP 35 MINERAL OIL | 0 | 10 | | | | | | | | | | | | | | |
| ESCOREZ 5320 | 0 | | | | | 35 | | 33 | | | | | | | | |
| WINGTACK EXTRA | 0 | | | | | | 20 | | | | | | | | | |
| ECR-188 | 0 | | | | | | | | | | 12 | | | | | |
| PICCOTEX 120 | 0 | 30 | | | | | | | | | | | | | | |
| EVA 18-150 | 60 | | | | | | | 33 | | | | | | | | |
| EVATANE 28-06 | 35 | | | | | | 39 | | | | | | | | | |
| EPOLENE C-13 | 94 | | | | | | | | | | | | 39 | | | |
| EPOLENE C-17 | 80 | | | | | | | | | | | | | | | |
| E82onMobil LD 202 | 80 | | | | | | | | | | | | | | | |
| AFFINITY PL 1280 | 77.3 | | | | | | | | | | | | | | | |
| AFFINITY SM 1300 | 82.1 | | | | | | | | | | | | | | | |
| AFFINITY EG8150 | 40 | | | | | | | | | | | | | | | |
| ELVALOY 1609 AC | 82 | | | | | | | | | | | | | | | |
| LOTRYL 37EH175 | 30 | | | 69 | | | | | | | | | | | | |
| LOTRYL 37EH550 | 30 | | | | 69 | | | | | | | | | | | |
| LOTRYL 09 MG 02 | 82.4 | | | | | | | | | 60 | 44 | 52 | | | | |
| LOTRYL 15 MA 03 | 65.3 | | | | | | | | | | | | 30 | | | |
| LOTRYL 24 MA 07 | 39 | | 65 | | | | | | | | | | | | | |
| LOTRYL 24MA005 | 42 | | | | | | | | | | | | | | | |
| LOTRYL 17BA07 | 65 | | | | | | | | | | | 59 | | | | |
| LOTRYL 35 BA 320 | 45 | | | | | | | | | | | | | | | |
| VECTOR 4411 | 0 | 49 | | | | | | | | | | | | | | |
| KRATON G 1650 | 0 | | | | | | | | | | | | | | | 21.0 |
| KRATON G 1652 | 0 | | | | | 15 | | | | | | | | 18.5 | 30 | |
| KRATON G-1657 | 0 | | | | | 10 | | | | | | | | 18.5 | | |
| IRGANOX 1010-DD TIN FREE | 0 | 1 | 1 | 1 | 1 | 1 | 1 | 1 | 1 | 1 | 1 | 1 | 1 | 1.2 | 1 | 1 |
| total | | 100 | 100 | 100 | 100 | 100 | 100 | 100 | 100 | 100 | 100 | 100 | 100 | 100 | 100 | 100 |

TABLE 2b

| | | formulas unsuitable because of migration resistance and DSC fusion specific heat capacity | | | | | | |
|---|---|---|---|---|---|---|---|---|
| | | 1601-00A | 1601-00B | 1601-88A | 1601-88B | 1601-156C | 1601-156D | 1601-156B |
| Brookfield Viscosity of the protector material at 350 deg F. in mPa · s | | 41000 | 64200 | 8640 | 2660 | 1490 | 8210 | 680 |
| tensile test of the material | | | | | | | | |
| elongation (%) | | | 670 | 648 | 58 | 37 | 681 | 571 | 45 |
| std dev (%) | | | 60 | 31 | 16 | 7 | 10 | 84 | 10 |
| enthalpy of fusion (calculation from raw materials' values) in J/g | | 22 | 99 | 85 | 85 | 84 | 98 | 90 |
| DSC enthalpy of fusion in J/g | | 15 | 87 | | 77 | 67 | 88 | 73 |
| migration at 60 deg C./6 mils after 14 days on a 1-in2-wide contact area with HMPSA products | | | | | | | | |
| high oil content adhesive | staining | stain to support | stain to support | stain to support | stain to support | stain to support | stain to support | stain to support |
| | tack | high | high | high | middle to high | middle to high | middle to high | middle to high |
| rosin ester containing adhesive | staining | stain to support | stain to support | stain to support | stain to support | | | |

TABLE 2b-continued

|  | tack | high | high | middle to high | high |  |  |  |
| --- | --- | --- | --- | --- | --- | --- | --- | --- |
|  |  | formulas unsuitable because elongation is not high enough in tensile strength test |  |  |  |  |  |  |
|  | 1416-75D | 1601-25A | 1601-25D | 1601-68E | 1601-84F | 1601-21D | 1601-21E | 1601-21F |
| Brookfield Viscosity of the protector material at 350 deg F. in mPa · s | 151000 | 22400 | 92000 | 57200 | 30900 | 4360 | 4530 | 17000 |
| tensile test of the material |  |  |  |  |  |  |  |  |
| elongation (%) | 34 | 15 | 32 | 41 | 51 | 34 | 4 | 5 |
| std dev (%) | 14 | 4 | 17 | 12 | 25 | 26 | 2 | 3 |
| enthalpy of fusion (calculation from raw materials' values) in J/g | 140 | 164 | 124 | 125 | 122 | 145 | 163 | 183 |
| DSC enthalpy of fusion in J/g | 125 |  | 104 |  |  |  |  |  |
| migration at 60 deg C./6 mils after 14 days on a 1-in2-wide contact area with HMPSA products |  |  |  |  |  |  |  |  |
| high oil content adhesive | low | low | low to middle | low | middle | low | none to low | none to low |
|  | none to low | none to low | low to middle | none to low | none to low | low | none to low | low |
| rosin ester containing adhesive | low | low | low | low | middle | none to low | none to low | none to low |
|  | none to low | none to low | none to low | none to low | none to low | none to low | none | none to low |

TABLE 3a

|  |  | formulas unsuitable because of migration resistance and DSC fusion specific heat capacity |  |  |  | suitable formulas |  |  |  |
| --- | --- | --- | --- | --- | --- | --- | --- | --- | --- |
|  | enthalpy of fusion of raw materials (J/g) | 1601-00A | 1601-00B | Evatane 18-150 | Evatane 28-150 | 1601-156B | 1601-110A | 1601-110D | 1601-110F | 1601-155E |
| 155 PARAFFIN WAX (65.5 deg C.) | 218.7 | 10 |  |  |  |  |  |  |  | 52 |
| 138 PARAFFIN WAX (58-60 deg C.) | 204.1 |  |  |  |  |  | 49 | 40 | 48 |  |
| 158 PARAFFIN WAX (68-70 deg C.) | 211.7 |  | 35 |  |  | 33 |  |  |  |  |
| PARAFLINT C80 | 226.7 |  |  |  |  |  | 10 | 10 | 10 |  |
| POLYWAX 655, PRILLED | 239 |  |  |  |  |  |  |  |  |  |
| KAYDOL USP 35 MINERAL OIL | 0 | 10 |  |  |  |  |  |  |  |  |
| ESCOREZ 5320 | 0 |  |  |  |  | 33 |  |  |  |  |
| WINGTACK EXTRA | 0 |  |  |  |  |  |  |  |  |  |
| ECR-188 | 0 |  |  |  |  |  |  |  |  |  |
| PICCOTEX 120 | 0 |  | 30 |  |  |  |  |  |  |  |
| EVA 18-150 | 60 |  |  | 100 |  | 33 |  |  |  |  |
| EVA 28-150 | 33 |  |  |  | 100 |  |  |  |  |  |
| EVATANE 28-06 | 35 |  |  |  |  |  |  |  |  |  |
| EPOLENE C-13 | 94 |  |  |  |  |  |  |  |  |  |
| EPOLENE C-17 | 80 |  |  |  |  |  |  |  |  |  |
| E82onMobil LD 202 | 80 |  |  |  |  |  |  |  |  |  |
| AFFINITY PL 1280 | 77.3 |  |  |  |  |  |  |  |  |  |
| AFFINITY SM 1300 | 82.1 |  |  |  |  |  |  |  |  |  |
| AFFINITY EG8150 | 40 |  |  |  |  |  |  |  |  | 20 |
| ELVALOY 1609 AC | 82 |  |  |  |  |  |  |  |  |  |
| LOTRYL 37EH175 | 30 |  |  |  |  |  |  |  |  |  |
| LOTRYL 37EH550 | 30 |  |  |  |  |  |  |  |  |  |
| LOTRYL 09 MG 02 | 82.4 |  |  |  |  |  |  |  |  |  |
| LOTRYL 15 MA 03 | 65.3 |  |  |  |  |  | 35 | 17 |  |  |
| LOTRYL 24 MA 07 | 39 |  |  | 64 |  |  |  | 17 | 26 |  |
| LOTRYL 24MA005 | 42 |  |  |  |  |  |  |  |  | 7 |
| LOTRYL 17BA07 | 65 |  |  |  |  |  |  |  |  |  |
| LOTRYL 35 BA 320 | 45 |  |  |  |  |  |  |  |  |  |
| VECTOR 4411 | 0 | 49 |  |  |  |  |  |  |  |  |
| KRATON G 1650 | 0 |  |  |  |  |  |  |  |  |  |
| KRATON G 1652 | 0 |  |  |  |  |  | 15 | 15 | 15 |  |
| KRATON G-1657 | 0 |  |  |  |  |  |  |  |  | 10 |
| IRGANOX 1010-DD TIN FREE | 0 | 1 | 1 |  |  | 1 | 1 | 1 | 1 | 1 |
| total |  | 100 | 100 | 100 | 100 | 100 | 100 | 100 | 100 | 100 |

TABLE 3b

|  | formulas unsuitable because of migration resistance and DSC fusion specific heat capacity | | | | | suitable formulas | | | |
| --- | --- | --- | --- | --- | --- | --- | --- | --- | --- |
|  | 1601-00A | 1601-00B | Evatane 18-150 | Evatane 28-150 | 1601-156B | 1601-110A | 1601-110D | 1601-110F | 1601-155E |
| Brookfield Viscosity of the material at 350 deg F. in mPa · s | 41000 | 64200 | not measured | not measured | 680 | 33900 | 21900 | 4200 | 47180 |
| tensile test of the material |  |  |  |  |  |  |  |  |  |
| elongation (%) | 670 | 648 |  |  | 45 | 669 | 674 | 317 | 685 |
| standard deviation (%) | 60 | 31 |  |  | 10 | 34 | 24 | 97 | 10 |
| enthalpy of fusion (calculation from raw materials' values) in J/g | 22 | 98 | 60 | 33 | 90 | 124 | 122 | 131 | 147 |
| DSC enthalpy of fusion in J/g measured on actual DSC curves | 15 | 87 | 60 | 33 | 73 |  | 105 | 117 | 109 |
| melting point observed on DSC curve (deg C.) |  | 71 |  |  | 75 |  |  | 65 | 66 |
| melting area observed on DSC curve (deg C.) |  | 15-85 |  |  | 25-90 |  |  | 20-90 | 25-85 |
| see DSC curve |  | (FIG. 3) |  |  | (FIG. 4) |  |  | (FIG. 1) | (FIG. 2) |
| blocking tests at 60 deg C./6 mils after 1 day on a 1-in2-wide contact areas obsevation of blocking forces | strong | strong | middle to strong | strong | middle to strong | none to low | none to low | none to low | none to low |
| migration at 50 deg C./3 mils after 4 days on a 1-in2-wide contact area with HMPSA products |  |  |  |  |  |  |  |  |  |
| high oil content adhesive staining | high | high | high | high | middle to high | none to low | none to low | none to low | none to low |
| tack | high | high | high | high | middle to high | none to low | none to low | none to low | none to low |
| rosin ester containing adhesive staining | high | high | high | high | middle to high | none to low | none to low | none to low | none to low |
| tack | middle to high | middle to high | middle to high | middle to high | middle to high | none | none | none | none |

TABLE 4a

|  |  | H2543 | H2543 | H2543 | H2543 skin material | H2543 | H2543 |
| --- | --- | --- | --- | --- | --- | --- | --- |
|  |  | with no contaminant | Armin 2-mils film | | 1601-00A | 1416-75B | |
|  |  | | | | % of skin material | | |
|  |  | 0.0% | 0.5% | 1.0% | 2.0% | 1.0% | 2.0% |
| dissolution test | visual observation when putting the film | no change | film floats to the top after being submerged | film floats to the top after being submerged | film floats to the top after being submerged | film floats to the top after being submerged | film floats to the top after being submerged |
|  | visual observation 30 min after the film has been incorporated | no change | film floats to the top after being submerged | film floats to the top after being submerged | film is slightly melted | film is slightly melted | film is slightly melted |
|  | visual observation after turning 10 times with a spatula | no change | film floats to the top after being submerged | film floats to the top after being submerged | film appears to be almost completely melted | film is partially melted | film is partlially melted |
|  | visual observation after stirring at 50 rpm during 30 min (or more) | no change | Lumps of different size film present after 30 min. Lumps present after about 3 hours. | Lumps of different size film present after 30 min. Lumps present after about 3 hours. | film appears completely melted | film appears completely melted | film appears completely melted |

TABLE 4b

| | | H2543 | H2543 | H2543 | H2543 | H2543 | H2543 |
|---|---|---|---|---|---|---|---|
| | | | | skin material | | | |
| | | with no contaminant | Armin 2-mils film | | 1601-00A | 1416-75B | |
| | | | % of skin material | | | | |
| | | 0.0% | 0.5% | 1.0% | 2.0% | 1.0% | 2.0% |
| aspect during the heat stability test | initial | slightly cloudy, water-white | cloudy, water-white | cloudy, water-white | slightly cloudy, water-white | slightly cloudy, water-white | slightly cloudy, water-white |
| | after 24 hours | light yellow, slightly cloudy | light yellow, slightly cloudy | dark brown skin along edges some brown streaks | light yellow, slightly cloudy | light yellow, slightly cloudy | light yellow, slightly cloudy |
| | after 48 hours | slightly darker in color | very slight brown streaking | brown streaking along edges and brown skin on top | slightly darker in color | slightly darker in color | slightly darker in color |
| | after 72 hours | slightly darker in color | very slight brown streaking slightly darker in color | some brown skinning, darker | slightly darker in color | slightly darker in color | slightly darker in color |
| softening point (R&B in deg F.) | initial | 157 | 158 | 161 | 162 | 158 | 160 |
| colour (Gardner) | initial | 1 | 1.5 | 1.5 | 1 | 1 | 1 |
| | after 72 hrs | 3.5 | 5 | 6 | 5 | 5 | 5 |
| viscosity in mPa · s at 300 deg F. after slightly mixing by hand in the glass jar | initial | 2400 | 2457 | 2650 | 2330 | 2460 | 2510 |
| | after 72 hrs | 670 | 525 | 750 | 400 | 650 | 690 |

TABLE 5

| | | H2543 | H2543 | H2543 | H2543 | H2543 | H2543 |
|---|---|---|---|---|---|---|---|
| | | | | skin material | | | |
| | | with no contaminant | Armin 2-mils film | | 1601-00A | 1416-75B | |
| | | | % of skin material | | | | |
| | | 0.0% | 0.5% | 1.0% | 2.0% | 1.0% | 2.0% |
| 3 gsm: 3 non overlaping spirals; 2" & ¼ wide spray 1st substrate = standard PE 2nd substrate = standard NW line speed = 560 feet/min (OT = 0.25 s) | fresh peel: peel strength in g/in 24 hrs after coating | 181 | 206 | 194 | 203 | 197 | |
| | standard deviation | 21 | 25 | 26 | 15 | 17 | |
| | Failure Mode | Cohesive Failure | Cohesive Failure | Cohesive Failure | Cohesive Failure | Cohesive Failure | |
| | peel strength in g/in when laminates have spent 4 weeks at 130 deg F. | 159 | 133 | 138 | 140 | 143 | |
| | standard deviation | 37 | 27 | 20 | 37 | 19 | |

TABLE 6

| | H2994 | H2994 | H2994 | H2994 | H2994 | H2994 |
|---|---|---|---|---|---|---|
| | | | skin material | | | |
| | no contaminant | 82B | | 75B | | 96F |
| Coating Weight of adhesive: | | % of skin material | | | | |
| 15 g/m² | 0.0% | 1.0% | 2.0% | 1.0% | 2.0% | 1.0% |
| Initial creep resistance | 72% | 72% | 76% | 68% | 77% | 72% |
| standard deviation | 5% | 4% | 5% | 3% | 2% | 5% |
| after ageing 4 weeks at room temperature | 57% | 57% | 56% | 62% | 57% | 59% |
| standard deviation | 5% | 4% | 5% | 4% | 5% | 4% |
| after ageing 4 weeks at 130 deg F. | 54% | 52% | 55% | 59% | 55% | 61% |
| standard deviation | 6% | 7% | 5% | 5% | 6% | 5% |
| Initial creep resistance | 80% | 80% | 79% | 79% | 77% | 75% |

TABLE 6-continued

|  | H2994 | H2994 | H2994 | H2994 | H2994 | H2994 |
|---|---|---|---|---|---|---|
|  |  |  | skin material |  |  |  |
|  | no contaminant | 82B | | 75B | | 96F |
| Coating Weight of adhesive: | | | % of skin material | | | |
| 15 g/m² | 0.0% | 1.0% | 2.0% | 1.0% | 2.0% | 1.0% |
| standard deviation | 3% | 4% | 4% | 4% | 4% | 5% |
| after ageing 4 weeks at room temperature | 70% | 73% | 75% | 66% | 70% | 71% |
| standard deviation | 3% | 5% | 6% | 3% | 5% | 5% |
| after ageing 4 weeks at 130 deg F. | 68% | 72% | 73% | 71% | 69% | 71% |
| standard deviation | 4% | 5% | 7% | 4% | 5% | 8% |

TABLE 7

| skin material | H2548 no contaminant | H2548 1601-155E | H2548 1601-110F |
|---|---|---|---|
| % of skin material | 0.0% | 2.0% | 1.0% |
| 180 degree T-Peel maximum of the peel value (g/in) | 2231.0 | 2206.5 | 2104.9 |
| standard deviation | 104.3 | 193.1 | 122.9 |
| 180 degree T-Peel average peel force value over displacement (g/in) | 2006.8 | 2066.1 | 2132.3 |
| standard deviation | 60.6 | 138.4 | 73.9 |
| softening point in deg F. | 196.4 | 196.8 | 197.1 |
| looptack (maximum load in lbf) | 2514.20 | 2057.80 | 2199.4 |
| standard deviation | 210.70 | 140.60 | 271.8 |
| viscosity at 325 deg F. in mPa·s | 6337.5 | 5937.5 | 5725 |
| SAFT value in deg F. | 137.3 | 139.7 | 138.7 |
| standard deviation | 2.1 | 0.6 | 2.1 |

We claim:

1. A package, comprising:
a plastic mass having a finite size and shape; and
a polymeric film surrounding said plastic mass, said polymeric film having a composition comprising:
at least about 25% by weight of a wax material; and
wherein the film composition has an enthalpy of fusion of at least about 100 J/g and an elongation value at break of at least about 100%.

2. The package of claim 1 wherein said polymeric film has a thickness of 10 microns to 100 microns.

3. The package of claim 1 wherein said polymeric film has a thickness of 10 microns to 300 microns.

4. The package of claim 1 wherein said polymeric film has a thickness of 40 microns to 2000 microns.

5. The package of claim 1 wherein said wax material comprises at least 40% by weight of said film composition.

6. The package of claim 1 wherein said wax material comprises 25% to 65% by weight of said film composition.

7. The package of claim 1 wherein said plastic mass is a material selected from the group consisting of a thermoplastic composition, a thermoplastic compound, a thermoplastic polymer, a thermosetting composition, a thermosetting compound, a thermosetting polymer, a hot melt composition, a hot melt compound, a hot melt polymer, a hot melt adhesive composition, a hot melt adhesive compound, a hot melt adhesive polymer, and blends thereof.

8. The package of claim 1 wherein said plastic mass comprises a hot melt adhesive composition.

9. The package of claim 1 wherein said wax material is selected from the group consisting of a petroleum wax, a synthetic wax, a polyolefin wax, an animal wax, a vegetable wax, and mixtures thereof.

10. The package of claim 9 wherein said petroleum wax is a paraffin wax.

11. The package of claim 9, wherein said synthetic wax is a Fischer-Tropsch wax.

12. The package of claim 9 wherein said polyolefin wax is selected from the group consisting of polyethylene, polypropylene, ethylene-based copolymers, propylene-based copolymers and mixtures thereof.

13. The package of claim 1 wherein said polymeric film composition further comprises:
about 5% to about 65% by weight of a partially crystalline ethylene-based polymer comprising a homopolymer, a copolymer, a terpolymer or an interpolymer having a melt flow index of 0.05 g/10 min. to 800 g/10 min. at 190° C. and a DSC melting point of 40° C. to 130° C.;
about 0% to about 40% by weight of a thermoplastic elastomeric block copolymer having a structure A-B, A-B-A, A-(B-A)$_n$-B, or (A-B)$_n$-Y wherein A comprises a polyvinyl aromatic block having a Tg higher than 80° C., B comprises a rubbery midblock having a Tg lower than −10° C., Y comprises a multivalent compound, and n is an integer of at least 3;
about 0% to about 25% by weight of an elastomer comprising a copolymer or terpolymer having a Tg lower than −10° C., said elastomer selected from the group consisting of an ethylene-based elastomer, a propylene-based elastomer, and blends of ethylene-based and propylene-based elastomers; and
wherein the amount of partially crystalline ethylene-based polymer, thermoplastic elastomeric block copolymer, and elastomer comprises about 30% or more of the total film composition.

14. The package of claim 13 wherein said ethylene-based polymer is selected from the group consisting of LDPE, VLDPE, LLDPE, MDPE, HDPE, EVA, EAA, EMA, EBA, EE2HA, EO, EP, EB EH, ESI and blends thereof.

15. The package of claim 13 wherein said ethylene-based polymer is EMA.

16. The package of claim 13 wherein said ethylene-based polymer is EO.

17. The package of claim 13 wherein said ethylene-based polymer is EB.

18. The package of claim 13 wherein said ethylene-based polymer has a melt flow index below 30 g/10 min.

19. The package of claim 13 wherein said ethylene-based polymer has a melt flow index below 7 g/10 min.

20. The package of claim 13 wherein said ethylene-based polymer has a DSC melting point below 100° C.

21. The package of claim 13 wherein said block copolymer is selected from the group consisting of SB, SBS, SIS, SIBS, SEBS, SEP, SEPS, SBBS and blends thereof.

22. The package of claim 13 wherein said block copolymer is SEBS.

23. The package of claim 13 wherein said block copolymer has a melt flow index below 15 g/10 min. at 190° C.

24. The package of claim 13 herein said block copolymer comprises 15% or less of said film composition.

25. The package of claim 13 wherein said elastomer is selected from the group consisting of EPR, EPDM and blends thereof.

26. The package of claim 13 wherein said elastomer is EPR having a propylene content of about 15% to 70% by weight.

27. The package of claim 13 wherein said elastomer is EPR having a propylene content of about 20% to 45% by weight.

28. The package of claim 13 wherein said elastomer is EPDM having an ethylene content of from about 20% to 80% by weight, a propylene content of from about 15% to 70% by weight, and a diene content of about 2% to 15% by weight.

29. The package of claim 13 wherein said elastomer comprises 15% or less of said film composition.

* * * * *